(12) United States Patent
Neifeld

(10) Patent No.: US 8,836,156 B2
(45) Date of Patent: Sep. 16, 2014

(54) FLUID FLOW ENERGY CONVERTER

(71) Applicant: Richard Alan Neifeld, Fairfax, VA (US)

(72) Inventor: Richard Alan Neifeld, Fairfax, VA (US)

( * ) Notice: Subject to any disclaimer, the term of this patent is extended or adjusted under 35 U.S.C. 154(b) by 0 days.

(21) Appl. No.: 14/004,056

(22) PCT Filed: Jan. 11, 2013

(86) PCT No.: PCT/US2013/021087
§ 371 (c)(1),
(2), (4) Date: Sep. 9, 2013

(87) PCT Pub. No.: WO2013/106610
PCT Pub. Date: Jul. 18, 2013

(65) Prior Publication Data
US 2014/0077501 A1   Mar. 20, 2014

Related U.S. Application Data

(60) Provisional application No. 61/585,558, filed on Jan. 11, 2012, provisional application No. 61/594,707, filed on Feb. 3, 2012.

(51) Int. Cl.
| | |
|---|---|
| *F03B 13/00* | (2006.01) |
| *H02P 9/04* | (2006.01) |
| *F03D 5/00* | (2006.01) |
| *F03D 5/06* | (2006.01) |
| *H02K 7/18* | (2006.01) |

(52) U.S. Cl.
CPC .. *F03D 5/06* (2013.01); *F03D 5/00* (2013.01); *Y02E 10/721* (2013.01); *Y02E 10/728* (2013.01); *Y02E 10/70* (2013.01); *Y02E 10/725* (2013.01); *Y02E 10/28* (2013.01); *F05B 2240/311* (2013.01); *F05B 2220/709* (2013.01); *F05B 2210/16* (2013.01); *F05B 2240/917* (2013.01); *H02K 7/1892* (2013.01)
USPC .......................................................... 290/54

(58) Field of Classification Search
CPC ............... F03D 5/06; F03D 9/00; F03D 5/00; F03B 13/00; F03B 13/26; F03B 17/00; F03B 17/06; F03B 17/061; Y02E 10/28; Y02E 10/22; Y02E 10/223; Y02E 10/38; Y02E 10/721; Y02E 10/728; Y02E 10/70; Y02E 10/725; F05B 2240/40; F05B 2210/16; F05B 2240/311; F05B 2220/709; F05B 2240/917; H02K 7/1892; H02K 7/18
USPC ........ 290/54, 53, 43, 42, 44, 55, 1 R; 416/81, 416/132 A
See application file for complete search history.

(56) References Cited

U.S. PATENT DOCUMENTS

| | | | |
|---|---|---|---|
| 1,766,765 | A | 6/1930 | Savonius |
| 1,835,018 | A | 12/1931 | Darrieus |

(Continued)

FOREIGN PATENT DOCUMENTS

| | | |
|---|---|---|
| CA | 2675947 | 2/2011 |
| SU | 23260 | 9/1931 |

(Continued)

OTHER PUBLICATIONS

Mar. 26. 2013, PCT International Search Report and Written Opinion PCT/US 2013/021087, ISR and WO for this application.

(Continued)

*Primary Examiner* — Javaid Nasri
(74) *Attorney, Agent, or Firm* — Neifeld IP Law, PC

(57) ABSTRACT

A novel oscillator comprises a curved sheet structure. The curved sheet structure comprises a curved sheet and a tensioner. The curved sheet structure oscillates when the tensioner of the curved sheet structure is extended between two rigidly or semi rigidly fixed points and the curved sheet structure is exposed to a fluid flow. The oscillation results in oscillating tension in the tensioner and oscillating motion of the tensioner in directions perpendicular and parallel to the direction of fluid flow. Energy conversion devices to couple the energy out of the oscillator include a coupling in line with the tensioner and a coupling generally perpendicular to the extension of the tensioner.

20 Claims, 15 Drawing Sheets

(56) References Cited

U.S. PATENT DOCUMENTS

| | | | |
|---|---|---|---|
| 4,024,409 A | | 5/1977 | Payne |
| 4,329,116 A | * | 5/1982 | Ljungstrom .................. 416/19 |
| 4,388,041 A | | 6/1983 | Dorr |
| 4,422,825 A | | 12/1983 | Boswell |
| 4,449,053 A | | 5/1984 | Kutcher |
| 5,183,386 A | | 2/1993 | Feldman et al. |
| 5,347,186 A | | 9/1994 | Konotchick |
| 5,531,567 A | | 7/1996 | Hulls |
| 5,818,132 A | | 10/1998 | Konotchick |
| 6,523,781 B2 | | 2/2003 | Ragner |
| 6,798,090 B2 | | 9/2004 | Cheung |
| 6,864,592 B1 | | 3/2005 | Hugh-Peter |
| 6,914,345 B2 | | 7/2005 | Webster |
| 7,012,340 B2 | | 3/2006 | Jwo-Hwu |
| 7,148,583 B1 | | 12/2006 | Shau |
| 7,250,697 B2 | | 7/2007 | Beaulieu |
| 7,309,934 B2 | | 12/2007 | Tu |
| 7,345,372 B2 | | 3/2008 | Roberts |
| 7,397,152 B2 | | 7/2008 | Stewart |
| 7,498,681 B1 | | 3/2009 | Kellogg |
| 7,573,143 B2 | | 8/2009 | Frayne |
| 7,573,163 B2 | | 8/2009 | Tu |
| 7,821,144 B2 | | 10/2010 | Frayne |
| 7,986,051 B2 | | 7/2011 | Frayne |
| 8,026,619 B2 | | 9/2011 | Frayne |
| 2005/0099010 A1 | | 5/2005 | Hirsch |
| 2008/0129254 A1 | | 6/2008 | Frayne |
| 2008/0297119 A1 | | 12/2008 | Frayne |
| 2009/0285668 A1 | | 11/2009 | Labrecque |
| 2009/0295163 A1 | | 12/2009 | Frayne |
| 2009/0302612 A1 | | 12/2009 | Gartner |
| 2009/0309362 A1 | | 12/2009 | Frayne |
| 2010/0207395 A1 | | 8/2010 | Frayne |
| 2010/0308592 A1 | | 12/2010 | Frayne |
| 2011/0150669 A1 | | 6/2011 | Frayne |
| 2011/0260453 A1 | | 10/2011 | Frayne |

FOREIGN PATENT DOCUMENTS

| | | |
|---|---|---|
| WO | WO/2008/151008 | 11/2008 |
| WO | WO 2009/058759 | 5/2009 |
| WO | WO 2010/053499 | 5/2010 |

OTHER PUBLICATIONS

Nov. 1996, Adanur, et. al. "On-Line Measurement of Fabric Mechanical Properties for Process Control", National Textile Center Annual Report, p. 67-70.

Dec. 18, 2011, "Standard Terminology Relating to Textiles" ASTM D123 http://www.astm.org/Standards/D123.htm.

Dec. 18, 2011, "Standard Test Methods for Mass Per Unit Area (Weight) of Fabric" ASTM D3776/D3776M, http://www.astm.org/Standards/D3776.htm.

Nov. 1999, Bassett, "Experimental Methods for Measuring Fabric Mechanical Properties: A Review and Analysis", Textile Research Journal, p. 866-875.

Dec. 18, 2011, "Polyethylene Terephthalate", Wikipedia, the free encyclopedia http://en.wikipedia.org/wiki/Dacron.

Dec. 18, 2011, "Ropes", Ropes Case Study, http://www-materials.eng.cam.ac.uk/mpsite/short/OCR/ropes/default.html.

Feb. 8, 2005, Argentina, "Fluid-Flow-Induced Flutter of a Flag", Pierce Hall, Cambridge MA USA.

Dec. 18, 2011, "Kevlar", Wikipedia, the free encyclopedia http://en.wikipedia.org/wiki/Kevlar.

Sep. 2002, Hare, "Perhaps the Simplest Homemade Electrical Generator in the World" Sep. 5, 2013, IOP press pp. 436-439.

Dec. 18, 2011, "Polyethylene Terephthalate"Wikipedia, the free encyclopedia http://en.wikipedia.org/wiki/Polyethylene_terephthalate.

Dec. 18, 2011, "Ripstop", Wikipedia, the free encyclopedia http://en.wikipedia.org/wiki/Ripstop.

Jul. 14, 2011, ISOC, "Study and Design of a Wing Oscillating Wind System" Jan. 10, 2012, IEEE http://ieeexplore.ieee.org/xpl/freeabs_all.jsp?amumber=5952221.

Nov. 1999, Schaeffer, "Tensile Strength Comparison of Athletic Tapes: Assessed Using ASTM D3759M-96, Standard Test Method for Tensile Strength and Elongation of Pressure-Sensitive Tapes", Journal Industrial Technology vol. 16, No. 1.

Jan. 1996, Wang, "Tensile Properties of Synthetic Fiber Reinforced Mortar" (1990) Concrete & Composites vol. 12 pp. 29-40, England GB.

Jan. 1996, "Tensile Property Testing of Plastics", MatWeb.com, http://www.matweb.com/reference/tensilestrength.aspx (Dec. 18, 2011).

Mar. 1, 2008, Hare, "FlutterMill", The Creative Science Centre, Sep. 5, 2013.

Dec. 18, 2001, "Units of Textile Measurement", Wikipedia, the free encyclopedia, http://en.wikipedia.org/wiki/Units_of_textile_measurement.

Jan. 2000, Fitt, "On the Unsteady Motion of Two-Dimensional Sails", IMA Journal of Applied Mathematics pp. 147-171.

Sep. 12, 2004, "Wind and Hydropower Station with Oscillating Wings", Vortex Oscillation Technology Ltd. http://www.vortexosc.com/modules.php?name=Content&pa=showpage&pid=87. (Jan. 9, 2012).

* cited by examiner

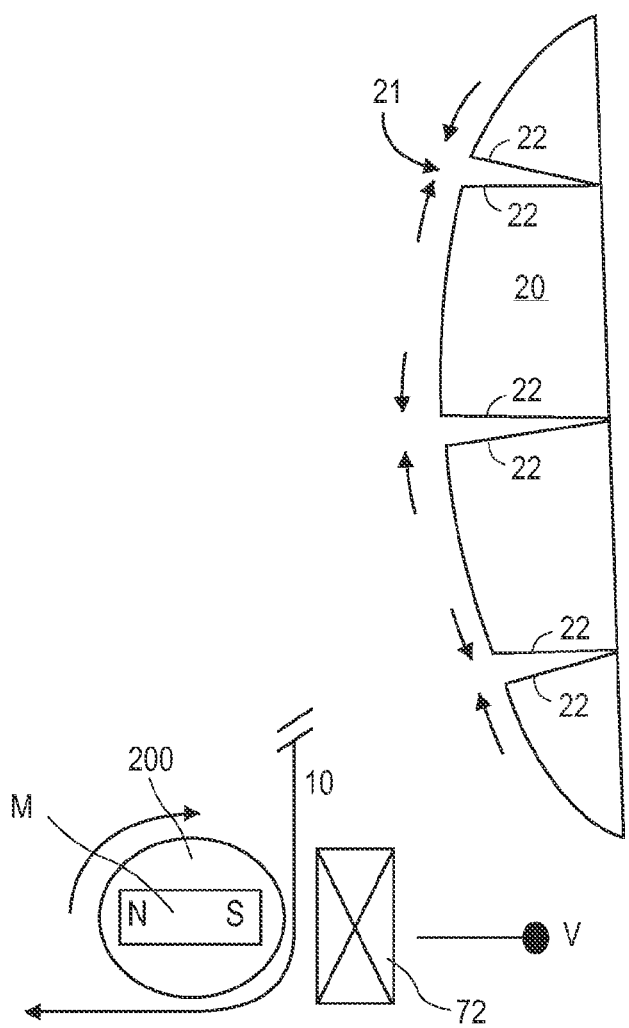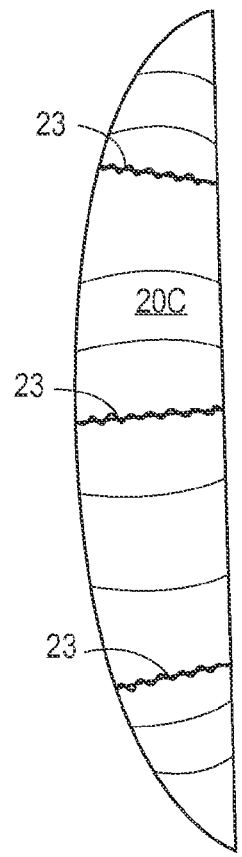
FIG. 21A
FIG. 21B
FIG. 22

FLUID FLOW ENERGY CONVERTER

This application claims priority to and incorporated by reference the entirety of the disclosures of U.S. provisional patent application 61/585,558 filed Jan. 11, 2012, titled "FLUID FLOW ENERGY CONVERTER" and U.S. provisional patent application 61/594,707 filed Feb. 3, 2012, titled "FLUID FLOW ENERGY CONVERTER."

FIELD OF THE INVENTION

The invention relates to energy conversion and power generation.

BACKGROUND OF THE INVENTION

There is an ongoing desire to convert energy in wind and water flow into usable energy, typically electrical energy. Shawn Frayne has disclosed oscillations in membranes used for energy conversion including a variety of mechanisms for energy conversion of the oscillations of the membrane. See PCT publication WO2008151008 titled "Energy Converters Utilizing Fluid-induced Oscillations," the teachings of which are incorporated herein by reference. In particular, the mechanisms for converting oscillating motion to electrical energy noted therein are generally applicable to the oscillator inventions noted below. David Labrecque has disclosed a rotating wing system for energy conversion, which uses oscillations in the length of a tensioning line for energy conversion. See US patent application publication 20090285668, the teachings of which are incorporated herein by reference. The mechanism for using oscillations in the length in the tensioning line therein to generate energy are generally applicable to the oscillator inventions noted below.

SUMMARY OF THE INVENTION

Novel Oscillator

I disclose a novel oscillator which may be driven to oscillate by fluid flow, and mechanisms to couple the energy out of the oscillator. The novel oscillator comprises a curved sheet structure. The curved sheet structure comprises a curved sheet and a tensioner. The curved sheet structure oscillates when the tensioner of the curved sheet structure is extended between two rigidly or semi rigidly fixed points and the curved sheet structure is exposed to a fluid flow field 11. The curved sheet structure oscillates in three dimensions, in a fundamental mode having a spatial wavelength of substantially twice the distance between the two fixed points, P, with that mode shown for the front edge of the curved sheet structure in FIGS. 2A, 2B. Referring to FIG. 1, energy is transferred from the fluid flow field 30 to the curved sheet structure 14. Curved sheet structure 14 comprises curved sheet 20 and tensioner or tensioning line 10. Tension in the tensioner varies periodically with the frequencies of the oscillation. The tensioner 10 is under tension during oscillation and moves periodically in the X and Y directions. These periodic motions and tensions may be coupled to energy conversion device 30 to extract energy from the oscillator.

Energy Conversion Device Coupling

One class of the energy conversion devices 30 couples to the tension along tensioner 10 at a point P in which case the point P does not constrain the tensioner along the direction of tension. For example, a pulley may be located at point P or a spring containing device connected to an end of tensioner 10 at point P. As the tension periodically varies, the motion is converted by the energy conversion device 30 to useful energy.

Another class of energy conversion devices 30 rely upon the force applied by movement of the tensioner in the X and Y direction, to a coupling connected to the tensioner at a non zero distance from the fixed point P.

Another class of energy conversion devices 30 converting the tension at fixed point P to electrical voltage using a piezo electric transducer (with extremely small variations in the length of the piezo electric material along the direction of tension in the tensioner 10.

Curvature of the Curved Sheet

The curvature in the curved sheet damps all modes of oscillation in the curved sheet structure except for the mode indicated by positions of the tensioner 10 a different times, shown in FIGS. 2A, 2B. This curvature is the curvature that exists in the curved sheet when the fluid flow field is zero. Preferably, this curvature exists when the curved sheet is under zero stress from gravity, fluid flow, and tension in the tensioner. Note specifically, the sheet structure, in the form of a sheet or web, has minimal resistance to bending moments out of the plane and therefore a curvature present in absence of all external forces my be deformed by the presence of gravity, for example in the case where gravity forced the sheet onto the ground.

Curvature along a direction, at a point in a sheet herein refers to the inverse of the radius, R, of curvature, of the curve at that point defined by that direction. Magnitude of curvature of a curve is 1/R. Direction of a curvature vector points from the sheet towards the origin of the circle defined by the curvature.

At substantially all points of a major surface of the curved sheet structure, curvature along all directions in the surface of the sheet point in the same direction relative to the curved sheet, either away from the curved sheet, or into the curved sheet. That is, the curvature has the same sign or direction over substantially all of the sheet. That is, there are substantially no inversions or saddle points in the curvature of the sheet. Exceptions where points of the sheet have opposite signs of curvature or saddle points may exist in relatively small (compared to the surface area of curved sheet) regions, as a consequence of manufacturing processes providing curvature, or imperfections in such processing. Generally, more than 50 percent of the surface area of a curved sheet structure must have curvature pointing away from the same side of the sheet in order for a fluid flow to induce the preferred mode oscillation in the curved sheet structure. Preferably, more than 70 percent, and more preferably more than 80 percent, have curvature pointing away from the same side of the sheet. This curvature condition exists when the sheet is installed in a oscillator with appropriate tension applied to the tensioner. This curvature condition normally also exists when the curved sheet structure is under zero stress, except for situations in which the application of tension to the tensioner is the cause of some or all of the curvature.

Extent of the Curved Sheet Between Fixed Points

The curved sheet must extend along a substantial length between the two fixed or substantially fixed points, for the curved sheet structure to oscillate. It must extend at least 30 percent of the length between the two fixed or substantially fixed points for oscillation to occur. Preferably, the curved sheet extends at least 60 percent of the length between the two fixed or substantially fixed points. More preferably, the curved sheet extends at least 80 percent of the length between the two fixed or substantially fixed points. Most preferably, the curved sheet extends more than 90 percent, and preferably over the entire length between the two fixed or substantially fixed points.

Description of the Oscillating Motion Curved Sheet Structure

During oscillation of the curved sheet structure, the trailing edge of the curved sheet trails in the Y direction of FIGS. 1-2. The tensioner 10 defines the leading edge of the curved sheet structure. This situation exists until the tensioner reaches one of its two extrema (+Ymax and −Ymax as shown in FIG. 2A) position along the Y direction. Close in time to when the tensioner reaches +Ymax and begins to move oscillate back to −Ymax, the curvature of the curved sheet inverts and switches direction from which it points away from the sheet. Consequently, fluid flow force applied along the Y direction to the curved sheet structure switches sign every half oscillation along the Y direction, providing positive feedback and transferring energy from the fluid flow to the oscillator.

FIG. 1 is a simplified view to explain the workings and constraints upon the novel oscillator. The existence of two fixed points constraining an end of the tensioner to be immobile is not essential and not present in many of the energy conversion device alternatives. The rectangular shape of curved sheet 20 is not preferred. Preferably, the edge of the curved sheet 20 has no sharp angles and no right angles. The two location where the edge of the curved sheet 20 connects to the tensioner preferably each have an angle relative to the extension of the tensioner of less than 90 and preferably less than 60, and more preferably less than 30 degrees. Preferably, the trailing edge of the curved sheet 20 is smoothly curved so that there are no abrupt transitions because it is difficult to induce suitable curvature in regions near abrupt transitions.

FIGS. 1 and 2 do not show the curvature in the curved sheet structure 20. A relatively small magnitude of curvature, as noted below, is sufficient to enable oscillation in the single mode noted above. FIG. 5 illustrates in three dimensions the curved sheet structure when no stress is applied thereto. FIG. 5 shows an embodiment illustrating one means to modify a flat sheet to impart curvature to form the curved sheet.

FIGS. 1 and 2 do not show a coupling mechanism coupling conversion device 30 to the tensioner 10. Various couplings and conversion devices 30 are shown in FIGS. 7-11, 19-20, 25, and 27. In some of these structures, such as in FIGS. 8 and 20, one of the fixed points P is replaced by a movable point or pulley and coupled to a spring whose far end is then coupled to a fixed point. Such couplings could replace one or both fixed points, P. Hence connection of the tensioner to one or more rigidly fixed points is not essential for transfer of energy out of the curved sheet structure.

The energy converter 30 converts the oscillations in position or tension of the tensioner 10 into one of: reciprocating linear motion; circular motion; or voltage and current. Oscillation substantially in the fundamental mode facilitates efficient and reliable energy conversion by resulting in oscillating motion in the X and Y directions of the tensioner 10 and oscillating tension in the tensioner 10.

The fundamental mode provides for periodic motion of the sheet in which substantially all of the sheet executes a periodic motion having the following characteristics. The leading edge oscillates in a sideways direction, which sideways direction is (1) perpendicular to the fluid flow and (2) perpendicular to a line connecting the two fixed points. The leading edge oscillates in the sideways direction such that at one time all of the leading edge is displaced to a first side of a line extending through the two fixed points, in this sideways direction. A half period later, the leading edge is displaced to the second side, opposite the first side, of the line extending through the two fixed points, in this sideways direction.

This fundamental mode has a frequency of oscillation in the Y direction of FIGS. 1, 2, which increases with increasing tension in the tensioner, and which increases with increasing fluid velocity.

Constraints Affecting Modes of Oscillation, Shape, Stiffness, Dimensions

Constraints affect the modes of oscillation in a sheet exposed to fluid flow. One constraint is the shape of the leading edge of the curved sheet. If the leading edge of the curved sheet is convex, then the center region of the center region of the leading edge of the curved sheet may deform under pressure from the fluid and fold back along the remainder of the sheet, thereby frustrating oscillation in a single mode. If the leading edge of the sheet is convex (when under no stress) and the leading edge is mechanically coupled to the tensioner, then tension in the tensioner induces stress along the direction of tension, in the curved sheet near the tensioner, changing the curvature of the curved sheet. Observation shows that tension in the tensioner in such structures tends to reduce curvature near the leading edge or the curved sheet.

A relatively large stiffness to bending in the curved sheet, will tend to damp out period oscillations along the direction of fluid flow, in the sheet. Those oscillations tend to have different frequencies than the period preferred mode noted above and are undesirable. Shortening the extent of the curved sheet in the dimension parallel to the direction of fluid flow eliminates longer wavelength and lower frequency modes of oscillation in the sheet along the direction of fluid flow. Relatively long extension of the curved sheet between the leading edge and trailing edge is desirable because that provides relatively larger sheet area over which fluid flow energy can be converted to oscillation energy.

Increasing the length of extension of the sheet between the two fixed points increases the wavelength of the preferred fundamental mode and reduces the frequency of that mode, and increases the number of allowed modes of oscillation in any frequency or wavelength range, for standing wave oscillations along the direction between the two fixed points. Increasing tension in the tensioner tends to damp the higher order oscillations along the front edge. Once the preferred fundamental mode builds up significant amplitude, other modes along the leading edge become energy forbidden due to the preferred fundamental mode's induced curvature in the tensioner and the constraint that the curved sheet is coupled to the tensioner.

Oscillations along the trailing edge of the sheet are substantially not constrained by the tension in the leading edge. Oscillations in the trailing edge tend to prevent energy buildup in the preferred mode noted above. The longer the extension of the sheet between the two fixed points, the higher the tensile strength required in the tensioner material (such as rope, cable, chain, or single fiber), which means increased mass and stiffness in the tensioner. Preferably, the tensioner 10 is more elastic material, such as polymer rope instead of chain.

Energy Considerations and Damping in Curved Sheets

In order to dampen oscillations in all non fundamental modes of the sheet, every point of the sheet should be curved in two independent directions. The shape of such a curved sheet approximates the shape of a half clam shell, that is curvature along a curve from leading edge to trailing edge, and curvature along a curve from bottom side to top side, with both curvatures pointing away from the same side of the curved sheet.

A result of a curvature in the curved sheet is that the lowest energy state of the curved sheet under stress induced by fluid flow exists when all regions of the sheet have the same sign of curvature, that is, the curvature points away from the same side of the sheet at all points of the sheet. Inverting the curvature to the exact opposite at every point has the same energy state and so those two energy states are degenerate. All energy states in which some region of the curved sheet has curvature pointing away from the opposite side of the sheet are higher energy states because it costs energy in the form of stress in the curved sheet. Consequently, curvature of the same sign throughout the curved sheet damps oscillations in the sheet parallel above the fundamental mode oscillation. A result of the damping oscillations of the higher order modes is that the length of a sheet exhibiting substantial oscillations in the preferred fundamental mode is unlimited.

If the curvature in the curved sheet along the direction from the leading edge to the trailing edge maintains the same sign independent of phase of oscillation in the fundamental mode, then the fundamental mode would dampen out. The sheet must have sufficient flexibility so that the curvature in this direction flips sign during fundamental mode oscillation. Symmetry and energy arguments noted above indicate that the sign of curvature in both direction switch sign substantially concurrently. In order for the curvature in the curved sheet to invert, the middle and trailing edges of the sheet must be elastic enough, that is have low enough Young's modulus. That condition is satisfied for curved sheets because the energy required to invert the curvature is not greater than the energy to stretch the sheet flat. The energy density per sheet volume required to flatten the sheet is ½ Young's modulus times strain squared. The pressure applied against by a fluid against the sheet is a function of the fluid flow density and velocity. Specifically, one half the fluid density times the square of the velocity times a shape factor. The shape factor depends upon the angle between the wind velocity direction and normal to the opposing region of the curved sheet and is of order 1. Sheet volume decreases with decreasing sheet width and accordingly selecting a thin enough sheet enables curvature to switch at a given fluid and fluid velocity. Likewise, increasing the velocity overcome resistance to switching of any particular sheet with pressure scaling as the square of the magnitude of the fluid velocity. Experiments using various polymer based sheets having areas ranging from about one hundredth of a square meter to a few square meters and sheet material having a thickness of a few thousandths of an inch to a about a hundredth of an inch, and various curvatures in the sheet, resulting in a cutoff wind velocity below which oscillation would not occur being on the order of a few tenths to about 2 miles per hour. In other words, oscillation occur over a wide range of sheet configurations and wind velocities for conventional sheet materials. Young's modulus for sheet materials contemplated for the sheets of this invention are in the range of about 0.01 to 10.0 Giga Pascals (about 1500 to about 1,400,000 pounds per square inch). These sheet materials include but are not limited to rubber; Teflon; polyethylenes; polypropylenes; polystyrenes; rayons; and nylons.

The tensioner 10 may be formed from rope of any composition, single strand polymer, or chain links. The tensioner should be selected to withstand tension anticipated to exist in the tensioner during oscillation. Safety release latch mechanism, that release the tensioner from one of the fixed points in case of excess tension, may be used to avoid excessive tension that might damage the tensioner.

Methods of Forming Curved Sheets

Curved sheets of the invention may be formed in a variety of ways. A curved sheet may be woven or extruded or molded. A flat sheet may have angled sections, that is sections having "V" shapes or shapes similar to "V" shapes with curvature added to one or both sides of the "V" shape, cut out of the trailing edge, and then the opposing edge where the "V" shape was removed connected. The "V"s or folds are designed to provide the curvature noted above. Connection may be by sewing, plasticizing, melting, glueing, or the like. Various pinches, causing folds in the sheet may be formed, and constrained to remain in the folded shape. Folds may be along any direction in the sheet. Alternatives to folds are ring pulls in which all sheet material in a small region is pulled together and constrained or removed from the sheet inducing radial strain about the center of the ring, in nearby regions of the sheet.

Fluid Oscillator Comparative Data

In an actual test device (herein below C1) exhibiting oscillation substantially in the preferred fundamental mode: the sheet length along the leading edge was 130 inches; the leading edge was substantially straight; the trailing edge formed a crescent such that the center of the trailing edge was 16 inches from the center of the leading edge, and the trailing edge was convex; 1.8 inches was pinched and folded out of the trailing edge, distributed at 3 pinch locations along the trailing edge; and one half as much (under 1 inch) was pinched and folded halfway from between the leading edge and trailing edge distributed at the 3 locations at the same positions along the sheet as the trailing edge folds; the sheet was formed from rip stop type nylon having a thickness of 0.003 inches (0.00008 meters), a center thickness of 16 inches. FIG. 5 shows the shape of the curved sheet in plane view; the sheet pinch or fold locations are identified as 51 to 56. That provided for a maximum strain along the rear edge for curvature inversion of 1.5/130=0.01. The tensioning line was formed from hemp rope having a pinched diameter of 0.05 inches. Pinching removed air space between fibers of the rope. This 0.5 inch diameter is greater than 10 times as thick and about 16 times as thick, as the sheet. The leading edge of the sheet was formed by wrapping one half inch of the sheet material over the hemp line and securing the wrap to the opposing surface of the sheet with duct tape. The duct tape had a width of 2 inches. Duct tape is an adhesive tape that will stick upon application of pressure, and has fibers embedded in it to increase its strength. One quarter inch of the wrapped sheet was contacted with the duct tape and the remaining 1.75 inches of the diameter of the duct tape contacted the opposing surface of the sheet extending from the wrap to the trailing edge. In this manner the hemp was secured inside the leading edge in a passageway extending the length of the sheet. Each pinched fold was secure on both side of the sheet with about a 2 inch by 2 inch sheet of duct tape. Duct tape secured the hemp rope in extended form at each end of the passageway, to prevent the sheet from slipping toward the middle of the hemp rope and crunching up during fluid flow. The hemp rope at a distance of about 4 inches from the top end of the sheet was secured to the end of a 12 foot aluminum pole.

Prior to adding the pinched folds, the foregoing device was tested for oscillations. First, in uniform fluid flow of up to a few miles per hour (due to wind, and running with the pole). Second, while twirling the pole such that the distant top end moved in circular motion substantially faster than the bottom end. Both types of tests were conducted with varying amounts of tension and varying displacement of the bottom end of the tensioning line from the pole. No uniform period oscillation along the leading edge was detectable under the following two conditions. Results: It did not oscillate substantially in the preferred mode. Instead, conventional aerodynamic flutter with mixed modes and no coherent motion along the length of the filter was observed.

After adding the three pinched folds only to the trailing edge (FIG. 5: 52, 54, 56), the foregoing device was tested for oscillations. First, in uniform fluid flow of up to a few miles per hour (due to wind, and running with the pole). Second, while twirling the pole such that the distant top end moved in circular motion substantially faster than the bottom end. Both types of tests were conducted with varying amounts of tension and varying displacement of the bottom end of the tensioning line from the pole. The device oscillated partially in the preferred fundamental mode noted above in all instances. However, the trailing edge was oscillating at a higher frequency than the leading edge. Some oscillating forces were felt by the hand holding the tensioning line at the bottom of the device.

After adding both the three pinched folds to the trailing edge (FIG. 5: 52, 54, 56) and the other three pinched folds midway between the trailing and leading edges (FIG. 5: 51, 53, 55), the foregoing device was tested for oscillations. First, in uniform fluid flow of up to a few miles per hour (due to wind, and running with the pole). Second, while twirling the pole such that the distant top end moved in circular motion substantially faster than the bottom end. Both types of tests were conducted with varying amounts of tension and varying displacement of the bottom end of the tensioning line from the pole. The device oscillated substantially in the preferred fundamental mode noted above in all instances. Very strong oscillating forces were felt by the hand holding the tensioning line at the bottom of the device. This included during the twirling tests in which wind speed at the top of the pole was greater than wind speed at the bottom of the pole, which means that the damping of other modes of oscillation was effective over a large differential in wind velocity along the length of the sheet.

It should be noted that this 130 inch long sheet device was constructed to test the scaling to large size after fabrication and testing of many smaller devices. The earlier smaller devices indicated the existence of oscillations in the preferred fundamental mode for sheets of any length (from a few centimeters to a couple feet long in the fluid flow direction and for the airs speeds of about 3-10 miles per hour (generated by a set of 4 vertically stacked box fans). These earlier smaller devices indicated a preferred length from leading to trailing edge of about 12 centimeters resulted in the greatest oscillations in the preferred mode of oscillation. These earlier devices extended between the fixed points separated by approximately 5 feet. All of these 5 foot devices oscillated in the preferred fundamental mode, except for those having a convex leading edge. Including one device made from opposing pieces of 2 inch thick duct tape and hemp rope. Other materials including Kevlar, rayons, and the like, were tested for existence of flutter, and all except the stiffest materials exhibited flutter in the 3-10 mph wind. Existence of flutter is an indication of suitability of the sheet material for the devices noted above.

Subsequent to the 5 foot devices, a few 9-10 foot devices and 130 inch devices were tested. These devices had various dimensions. Only the devices with a non convex front surface, and with crimps along at least the trailing edge oscillated in the preferred fundamental mode.

Several of the oscillators were hooked up to mechanical to electrical conversion devices including a magnet, a coil, and in some instances a diode bridge, shunt resistor, and photodiode for display. One coupling included a metal rod having one end taped to near the bottom fixed point of the tensioning rope, a magnet connected to the rod, and the rod extending horizontally traversing the coil. The rod was rotatably coupled to the tensioning line in that it could swivel about the tensioning line. The magnet oscillated in space back and forth at the opening of the coil, resulting in several volts periodically being generated, as read on an oscilloscope. This connection allowing the rod to swivel allowed both points, P, to remain fixed, and therefore, periodicity of the induced electromotive force was not changed due to this coupling. Another energy conversion device included a spring having one end connected to the ground fixed point, and the other end connected to a magnet assembly, and the magnet assembly tied to the bottom end of the tensioning rope. This mechanism was less preferred because, in addition to the up and down oscillations, the magnet banged of the sides of the coil due to the sideways and fluid flow directions of oscillation of the tensioning rope. Several other energy conversion devices are noted in the cited publications. Only novel devices are specified in the drawing in this application.

One oscillator device with a relatively large concave front edge (130 inch long device) failed to oscillate in the preferred fundamental mode. This device was had a substantial convex curve to the leading edge before application of tension to the leading edge via the tensioning line. It appears that this device failed to oscillate because application of tension to the tensioning line along the leading edge, that is the front surface of the curved sheet device, resulted in slack in the rear surface. Slack in the rear surface is contrary to the requirement for positive curvature for filtering out other than the preferred fundamental mode.

One 9-10 foot device having a straight trailing edge, a straight leading edge, and a depth between leading and trailing edges of about 12 centimeters, oscillated in the preferred fundamental mode. However, it appeared that some of the higher order modes along the trailing edge may not have been entirely suppressed. This device had 3 small folds in the trailing edge. These folds were about 0.2 inches, each. In this device addition of folds result in changes in the curvature of the sheet under zero strain. The initially straight front edge became convex thereby preventing oscillations when no tension was applied to the leading edge. Substantial tension had to be applied to the front edge to overcome the front edge concave curvature's damping of the preferred mode. It may be that this excessive front edge tension required to initiate oscillations in the preferred mode in the leading edge contributed to the failure of complete damping of trailing edge non preferred oscillations.

Observations show that the leading edge of the sheet performs periodic oscillation in both the sideways direction, and in the direction of fluid flow, as shown in FIGS. 2A and 2B. The frequency of the oscillation in the direction of fluid flow (direction X in FIGS. 1-2) is twice the frequency of oscillation in the sideways direction perpendicular to the direction of fluid flow and perpendicular to a line extending between the two fixed points (direction Y in FIGS. 1-2). Each point along the leading edge executes a path forming a deformed figure "8" shape, as shown in FIG. 3. The figure "8" path has twice as many maxima along the direction of fluid flow as along the direction perpendicular to fluid flow, over any extended period of time. The oscillations along the direction perpendicular to fluid flow (Y direction, FIGS. 1-2) are generally substantially larger than the oscillations along the direction of fluid flow (X direction, FIGS. 1-2). However, the oscillations in the direction of fluid flow may also be used for energy conversion for example to couple a rack and pinion to one another only during motion towards one side of the oscillation in motion along the sideways direction (e.g., FIG. 10).

Alternatively, the tensioning line may be constrained in space by an interior surface similar in shape to a figure "8" but having an opening at the point of junction of the two interior spaces, and gears placed along adjacent thereto having teeth extending to within the open spaces such that movement of the tensioning line in a figure 8 shape along the constraining interior surface drives the gears due to pressure on the teeth (e.g., FIG. 10).

The following results show that a very small curvature in a sheet results in substantially complete damping of the non preferred modes. Presented below are the results for C2-C9 which have variations in the length of the folds in device C1 noted above. These oscillator devices had flaps at the center and ½ way from the center to each end (about at 32, 65, 98 inches from the bottom of each sheet) of dimensions at the trailing edge of 0.4, 0.5, and 0.4 inches, for C1, and flaps midway between leading and trailing edges of ½ those values. Results for C1 to C9 are presented below. See FIG. 5. These results show the breadth of size of fold, and hence curvature, over which preferred oscillation in the fundamental mode occurs, and other factors such as front edge concavity and tensioning line tension, upon oscillations.

C1: Fold sizes at trailing edge, in inches: 0.4; 0.5; 0.4. Fold sizes midway between leading and trailing edge: 0.2; 0.25; 0.2. Results: Strong preferred oscillations; no non preferred oscillations.

C2: Fold sizes at trailing edge, in inches: 0.2; 0.25; 0.2. Fold sizes midway between leading and trailing edge: 0.2; 0.25; 0.2. Results: Strong preferred oscillations. Some non preferred oscillations towards the trailing edge.

C3: Fold sizes at trailing edge, in inches: 0.0; 0.0; 0.0. Fold sizes midway between leading and trailing edge: 0.2; 0.25; 0.2. Results: Strong preferred oscillations. Substantial non preferred oscillations towards the trailing edge, and at a higher frequency than the preferred oscillations.

C4: Fold sizes at trailing edge, in inches: 0.8; 01.0; 0.8. Fold sizes midway between leading and trailing edge: 0.2; 0.25; 0.2. Results: Leading edge under no tension slightly convex. Tension along leading edge initially required to eliminate leading edge concavity and initiate oscillations. Without tension, device initially did not oscillate. During and after initial tension substantially removing leading edge concavity, device oscillated in the preferred fundamental mode throughout the sheet at low wind velocity (about 1-4 miles per hour). At higher wind velocity, the leading and trailing edges each oscillated in a coherent manner, that is, along their respective entire lengths they each had a common phase and single frequency. However, the trailing edge oscillated at a higher frequency than the leading edge. That is, the additional tension or curvature along the trailing edge effectively decoupled the trailing edge from the leading edge such that two there existed two different modes of oscillation, one at the leading edge and one at the trailing edge. Both oscillations were strong. C5: Fold sizes at trailing edge, in inches: 0.8; 01.0; 0.8. Fold sizes midway between leading and trailing edge: 0.4; 0.5; 0.4. Results: Leading edge was initially concave. Initially, without any tension in the leading edge, device did not oscillate. After tension sufficient to substantially eliminate concavity in the leading edge, device oscillated only in the preferred fundamental mode. Oscillations were very strong. Even when tension on the leading edge was relaxed before application of wind flow, application of wind flow resulted in oscillation.

C6: Fold sizes at trailing edge, in inches: 0.2; 0.25; 0.2. Fold sizes midway between leading and trailing edge: 0.1; 0.125; 0.1. Results: The trailing edge exhibited coherent strong oscillations in a fundamental mode. The leading edge exhibited only weak oscillations in the preferred fundamental mode; these oscillations depended upon tension in the leading edge; high tension in the leading edge resulted in minimal oscillations in the fundamental mode.

C7: Fold sizes at trailing edge, in inches: 0.2; 0.25; 0.2. Fold sizes midway between leading and trailing edge: 0.1; 0.75; 0.1. Results: High tension in the leading edge resulted in oscillations substantially in the preferred fundamental mode, at all wind speeds. As tension was lowered, non preferred mode oscillations occurred at all wind speeds.

C8: Fold sizes at trailing edge, in inches: 0.5; 0.25; 0.5. Fold sizes midway between leading and trailing edge: 0.1; 0.125; 0.1. Results: Trailing edge exhibited a coherent oscillation along its length, but that oscillation was decoupled with the leading edge. Leading edge did not exhibit substantial oscillations.

C9: Fold sizes at trailing edge, in inches: 0.0; 0.0; 0.0. Fold sizes midway between leading and trailing edge: 0.0; 0.0; 0.0. Results: As noted above, no preferred fundamental mode oscillations. This device exhibited only aerodynamic flutter.

The foregoing C1-C9 results show that: oscillation in the preferred fundamental mode occurs when strain is induced into the middle and trailing edge of a sheet; that oscillation in the preferred fundamental mode occurs over a wide range of wind velocities and tensions in the leading edge; that structures in which oscillations in the fundamental mode are most stable and occur over the widest ranges of wind velocities and leading edge tensions have the length of folded material increasing linearly from the leading edge to the trailing edge of the sheet; that there is a minimum amount of strain required to induce oscillations in the preferred fundamental mode; that strain along interior regions, not just the trailing edge, is required to constrain non fundamental mode oscillations for sheets length along the air flow direction of greater than about 12 centimeters. It should be clear that additional constrained folds at additional locations to cause a more uniform strain in sheet, that is a strain caused by more than locations of constrained folds should result in more stability of oscillation in the preferred fundamental mode. It should be clear that similar strain will be effective in inducing oscillations in the preferred fundamental mode in other fluids, such as water.

Curvature Ratio, CR, and Quantitative Characterization of Single Mode Oscillations The curvature of examples C1-C9 in which the sheets may be characterized by ratios relating to the length reduction to the total length of the leading edge.

Define LEL, Leading Edge Length, to be the length of the leading edge of the curved sheet. For C1-C9, this is 130 inches.

Define Depth To Fold, DTF, to be the length from the leading edge of the sheet to the point line parallel to the leading edge where folds were made.

Define Fold Length, FL, to be the total amount of length removed by folds at the specified DTF.

Curvature of the C1-C9 examples is characterized by the Curvature Ratio, CR: CR=FL divided by the product of LEL and DTF, or CR=FL/(LEL times DTF). CR has units of inverse length.

LEL is 130 inches in all cases. DTF is either 8 inches or 16 inches. The values for CR indicate that when the same CR is the same for DTF=8 inches and 16 inches, the oscillator oscillates in the preferred single mode when CR is greater than about 0.0003 (For C6, CR=0.0003125; for C1, CR=0.000625; for C5, CR=0.00125; these are the examples in which CR did not depend upon DTF). Completely single mode oscillations occurred when CR was 0.0006 or greater (examples C1, C5).

For examples in which CR was different at DTF of 8 inches and 16 inches, the modes of oscillation at the leading edge and trailing edge tended to be decoupled, so that dual mode oscillations occurred (C3, C4, and C8 experienced decoupling). When CR=0 (lack of any curvature, example C9), only aerodynamic flutter (large numbers of modes of varying spatial frequencies and no coherent oscillations) occurred.

Additional folds can be added at varying locations (varying distances from the leading edge and at locations interspersed throughout the sheet) to induce curvature to avoid non preferred oscillations. The fractional reduction in trailing edge length required to obtain oscillations in the preferred (fundamental) mode should scale independent of length of the sheet. That is, the total curvature between the front edge and the back edge, and the total curvature between to top side and the bottom side, of the sheet, required to provide the desired oscillation mode, should be independent of scale of the sheet. Accordingly, the C1 type of structure, and structure like C1 but having variations in the shape of the trailing edge, are scalable to arbitrary sizes. Both the length of the sheet along the fluid flow direction and the length of the sheet perpendicular to the fluid flow direction may be increased to provide for an increased oscillating tension in the tensioner, and the strength of the tensioner may be increased. These changes should not increase the cutoff wind speed below which oscillations in the preferred fundamental mode fail to occur, and increase in sheet size may reduces the cutoff wind speed.

Alternatives

In water, due its higher density, and other liquids, the length of along the flow direction of the sheet can be much shorter that in air, to obtain the same total force on the sheet.

A small initial concavity to the leading edge may be desirable to counter the effect of the tension due to curvature in the middle region and trailing edge tending to deform the leading edge towards concavity.

Alternatives to the curved sheet incorporating rigid plate elements are shown in FIGS. 11-15 and now discussed.

Although not currently preferred, the same concept of curvature may be used in alternatives to sheet materials. For example, discrete rigid plates of various shapes (square, rectangular, triangular, trapezoidal), may be coupled to one another by flexible components, such as springs, wires, chains, or threads to form a composite surface having some curvature but with enough flexibility (due to flexibility resulting from the springs, wires, chains, or threads) the for the curvature direction to invert under fluid flow along a leading edge. Use of rigid plates, whether of hard plastic, metal, crystalline or ceramic materials, and very strong connectors there between (from the springs, wires, chains, or threads) may provide for a larger ultimate strength enabling operation at higher fluid flow velocities than a flexible sheet including natural, carbon, or polymer fibers.

Alternatively, discrete rigid plates and regions of sheet may be intermixed. For example, discrete plates may be used in the leading edge and sheets used to form a trailing edge. One possible advantage of this design is that the trailing edge sheet may promote oscillation since flexible sheet is sensitive to low fluid flows resulting in aerodynamic flutter at low speeds, whereas a rigid plates in the high tension front edge may provide a higher ultimate failure strength. Greater mass in the rigid plates may slow down oscillations frequency in the preferred fundamental mode. In this type of structure, the line of tension be set back from the leading edge because the leading edge is rigid and therefore will not deform and folder over in response to fluid flow, or become convex due to stress resulting from curvature in sheet material behind the leading edge. In addition, about an axis extending along the extended direction of a fixed wing are known to occur in response to fluid flow over the wing, for certain wing configurations. Corresponding oscillations occur in the foregoing structure resulting qualitatively in the same type of periodic oscillation in tension along the tensioner line, and the same type location deviation along the two directions perpendicular to the rotational axis of the fixed wing.

Alternatively, parallel curved sheets, each having similar design (dimensions, induced strains, and leading edge tension at zero fluid flow speed), may be coupled to one another, for example by ropes, threads, or strands, connecting to corresponding locations along the leading edge, or the trailing edge, or both, and at various places along the edges. These connecting ropes have an extension length approximately equal to the separation of the fixed points for each parallel sheet. Coupling induces the parallel curved sheets to oscillate in phase and frequency, allowing combination of tensions in their tensioners into a single line under the combined tension in which the tension in this single line oscillates with the combined tension of the individual lines.

Alternatively, plural sheets of similar design may all be coupled using linearly oscillating linkages to rotationally drive a single shaft in which the frequency, phase, and magnitudes of linear oscillations of each of the plural sheets can be different from one another. In this case, these linkages may intermittently coupleable to the single shaft each by a separate slip linkage. The slip linkage may for example use a saw tooth rack for each linear oscillation. The slip linked latching to an opposing teeth of a pinion only when the rack is moving faster in one direction than the pinion teeth. When the pinion teeth are moving faster than the saw tooths of the rack no latching occurs and the pinion teeth slip past the saw tooths.

BRIEF DESCRIPTION OF THE DRAWINGS

The following figures show aspects of the foregoing inventions. Like features are described using the same reference numerals and descriptors. Unless otherwise stated components shown in one embodiment are interchangeable with corresponding components providing the same generic function in another embodiment.

FIG. 21A is a plan view of a flat sheet having cut outs 21;

FIG. 21B is a plan view of the sheet of FIG. 21A with the edges of cutouts joined to form a curved sheet;

FIG. 22 is a partial side sectional view of a novel alternative energy conversion device useful with any of the pulley couplings noted herein above;

DETAILED DESCRIPTION OF THE FIGURES

Figure 1:
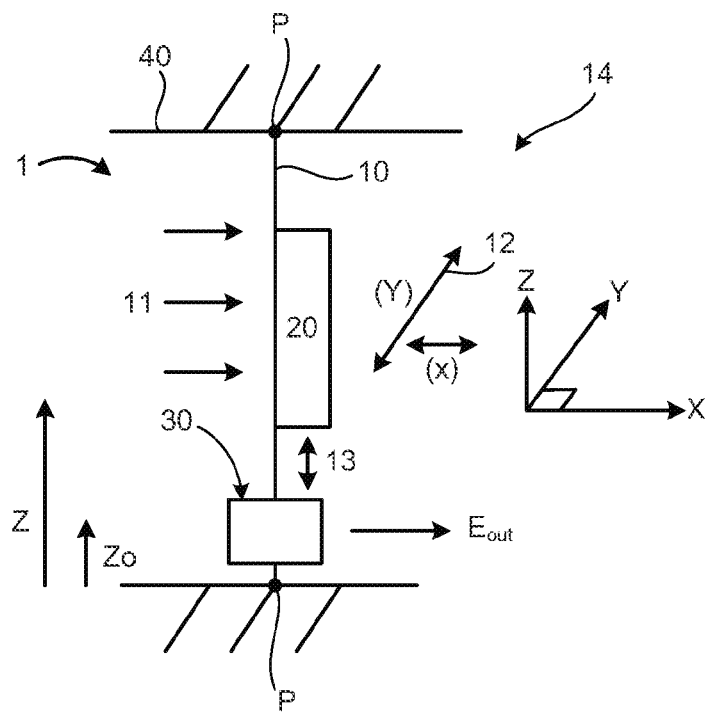
FIG. 1 is a perspective schematic overview of a novel device 1 for converting fluid flow to useful energy.

FIG. 1 schematically shows a novel device 1 for converting fluid flow in fluid flow field 11, such as wind or water flow, to useful energy. Device 1 comprises a curved sheet structure 14 and energy converter device 30. Curved sheet structure 14 comprises tensioner or tensioning line 10 and curved sheet 20. Structure 40 provides constraints at both ends of tensioner 10 so that the ends of tensioner 10 are constrained to be immobile at the two fixed points, P. X, Y, and Z axes along perpendicular directions are shown for reference. Orientation of X, Y, and Z directions shown in FIG. 1 correspond to the X, Y, and Z directions of the tensioner 10 and curved sheet 20, discussed in the remainder of the figures.

In operation fluid flow along X generates oscillations in the preferred fundamental mode in sheet 20 resulting in periodic oscillations of the sheet along Y, and periodic oscillations of the sheet along X, as indicated by two headed arrows. Tensioner 10 is coupled to energy converter 30 which converts periodic oscillations in energy from the tensioner (either oscillations in the tension along the tensioner 10 or spatial oscillation of tensioner 10 along Y, and/or X directions) to useful output energy, Eout. Tensioner 10 is shown oriented along the Z direction. However, tensioner 10 may be oriented along any particular direction relative to the surface of the earth. Structure 40 may be any structure fixing two points of tensioner 10 relative to one another. One example is a pole. Other examples are a tree, the ground, and a building.

Figure 2A:
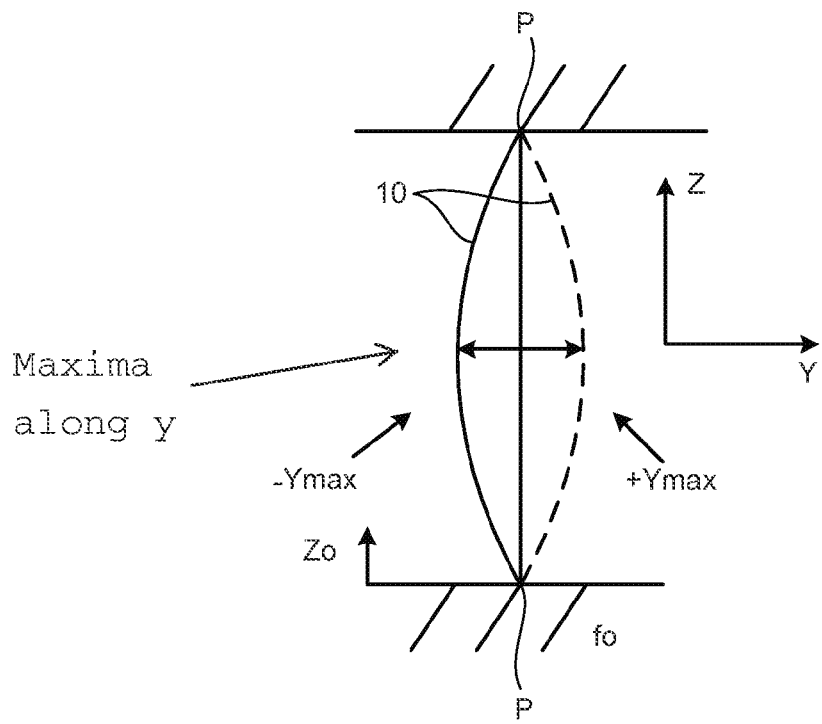
FIG. 2A is an illustration relating to the device of FIG. 1 showing oscillation in the Y-Z plane of the preferred fundamental mode.

FIG. 2A illustrates the preferred mode of oscillations, in the Y-Z plane, showing positions of the tensioner 10. There is a single maxima point at a height Z0 long the Z direction, and at Y equals Ymax, and a second maxima point at Z0 and minus Ymax. The frequency of oscillation in the Y-Z plane is fo.

Figure 2B:
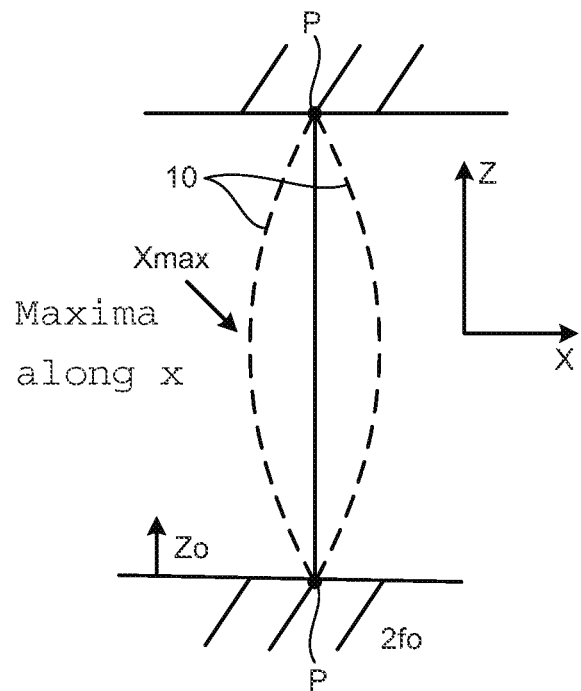
FIG. 2B, is an illustration showing oscillation in the X-Z plane of the preferred fundamental mode of the device shown in FIG. 1.

FIG. 2B illustrates the preferred mode oscillations in the X-Z plane. There is a single maxima long the Z direction, Xmax, at either end of the oscillations in the X-Z plane. The frequency of oscillation in the X-Z plane is 2 times fo, 2fo. The magnitude of oscillation in the X-Z plane (along the fluid flow direction) is smaller than in the Y-Z plane (perpendicular to the fluid flow direction).

Figure 3:
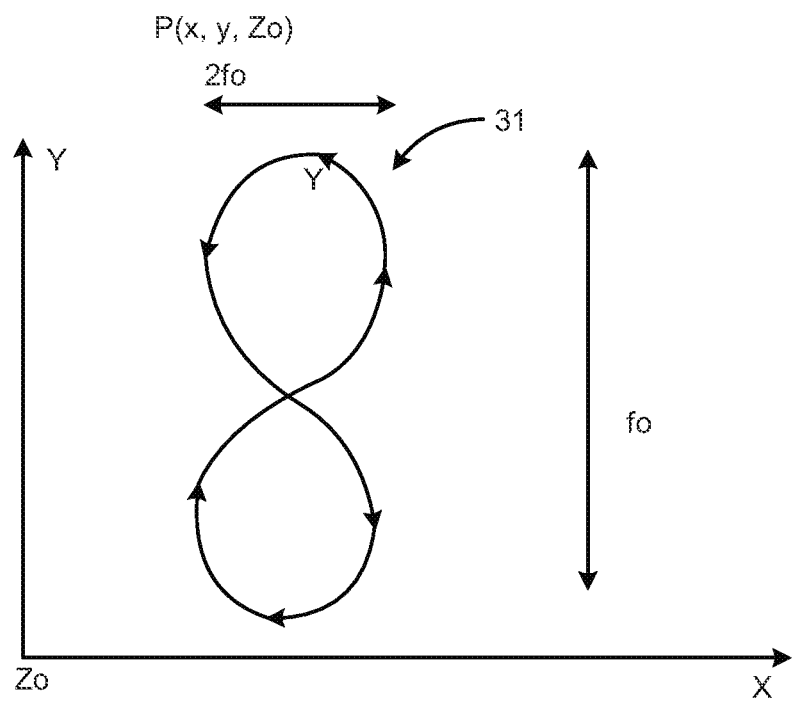
FIG. 3 is an illustration in the X-Y plane at height along the z direction of Z0, showing path of the tensioner 10 for the device of FIG. 1 oscillating in the preferred fundamental mode.

FIG. 3 is an illustration in the X-Y plane at height along the z direction of Zo. Zo is shown in FIGS. 1 and 2 to be a position along tensioner 10 at which energy converter 30 resides. FIG. 3 shows a path 31 in this Zo plane traversed by tensioner 10. Oscillation at twice the frequency along x as along y results in a path forming two loops, a generalized figure "8" shape.

Figure 4:
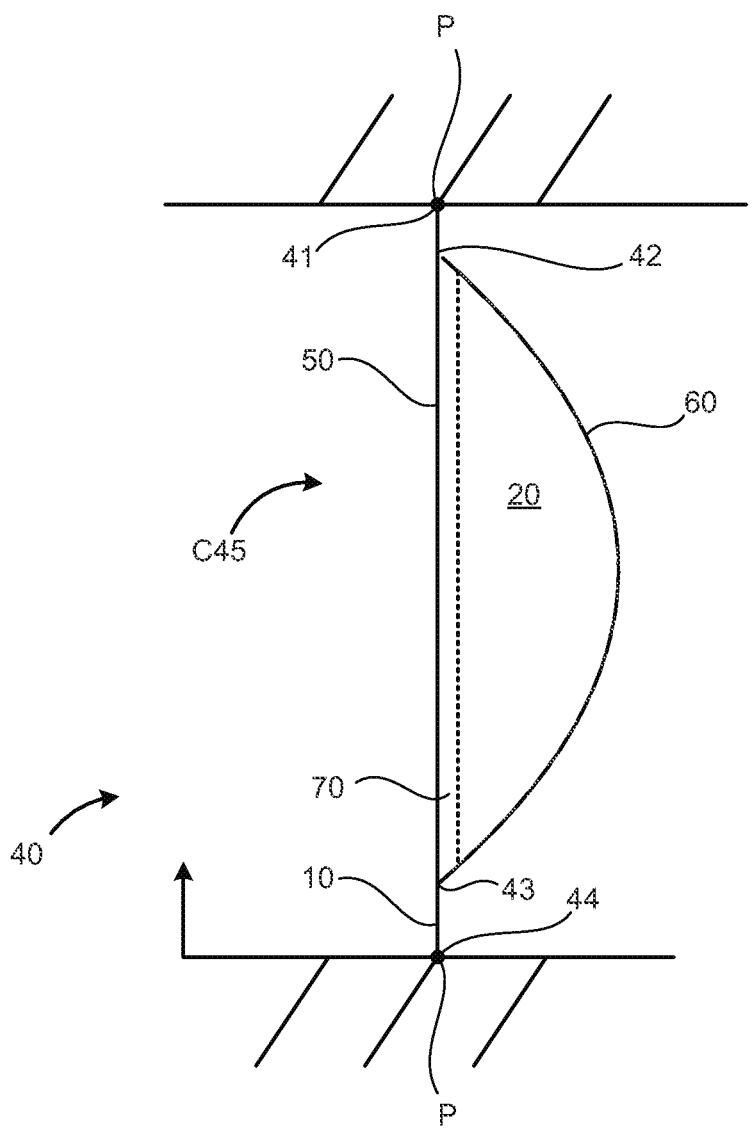
FIG. 4 is an illustration relating to C1-C9 embodiments discussed above, showing their shape as would be seen in the Z-X plane of FIG. 1.

FIG. 4 illustrates the C1-C9 embodiments discussed above. FIG. 4 shows constraints 41, 42, 43, and 44. Constraints 41, 44 indicate the two fixed points of the tensioner 10. C45 indicates the C structures noted above. Constraints 42, 43 indicate the fixing of the ends of the sheet along the leading edge of the sheet to the tensioner 10. Leading edge 50 is shown as linear. Trailing edge 60 is shown as arcuate with a convex shape. Passage 70 through which tensioner 10 extends is shown adjacent leading edge 50.

Figure 5:
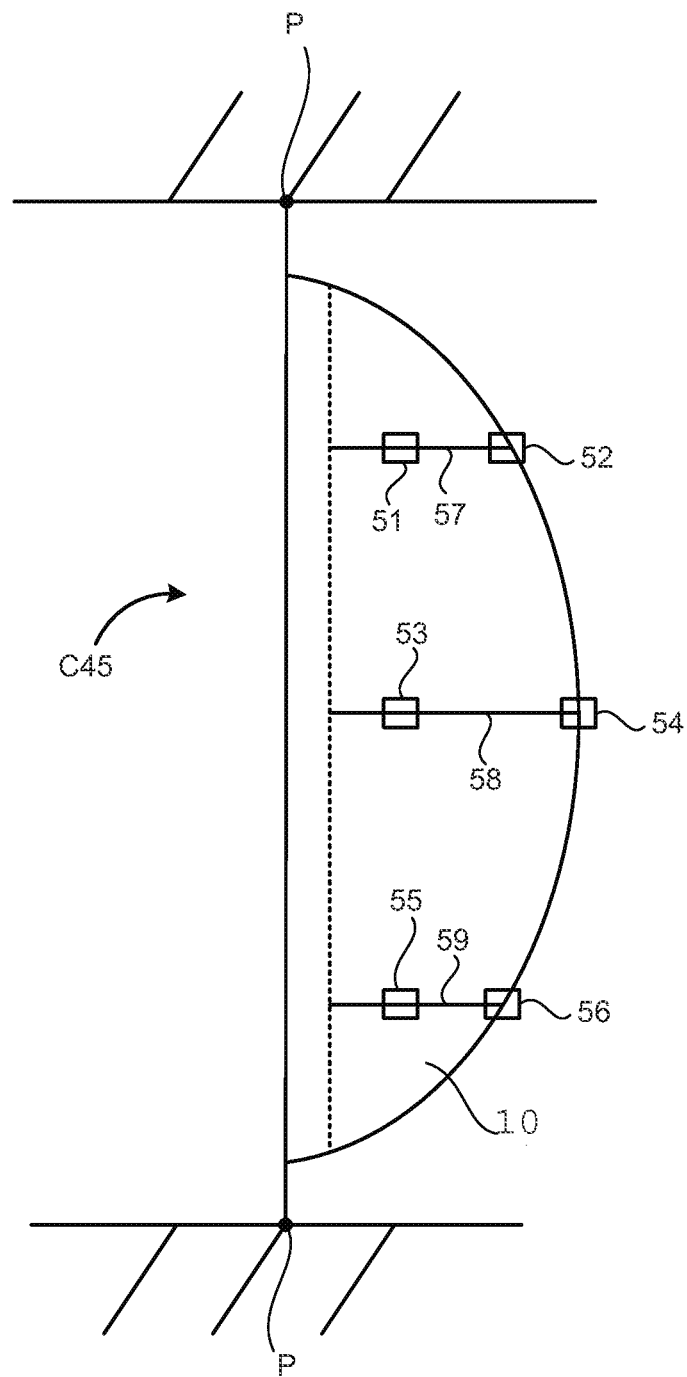
FIG. 5 illustrates the C1-C9 embodiments showing location of folds forming the constraints inducing curvature in the curved sheet.

FIG. 5 shows duct tape pieces 51, 52, 53, 54, 55, 56 providing corresponding constraints. Each duct tape piece taping a pinched fold regions of curved sheet 10, and fold lines 57, 58, and 59. Preferably, pinched folds are constrained on both sides of the sheet, such as by tape stitching, or glue. As noted above fold lines may be replaced with cut out sections, preferably pie piece shaped sections, which are cut out, and then opposing edges sown or glued or tapes together, as shown in FIG. 21.

Figure 6A:
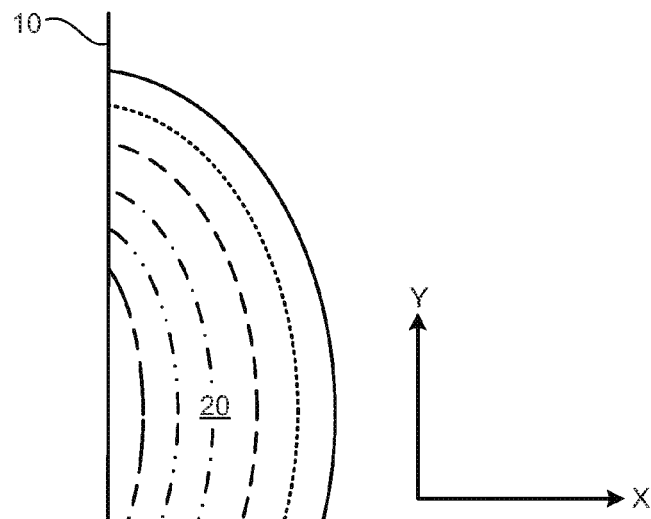
FIG. 6A-C illustrates the half clam shell shape curvature of a curved sheet of the invention, with views in the X-Y; X-Y; and X-Z planes respectively.
Figure 6B:
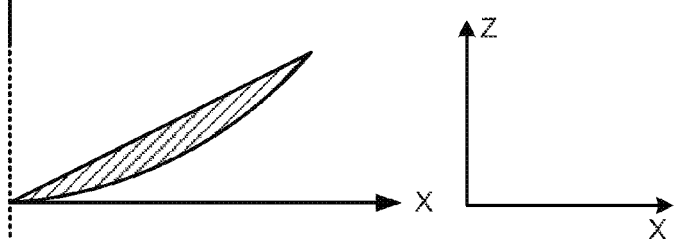
Figure 6C:
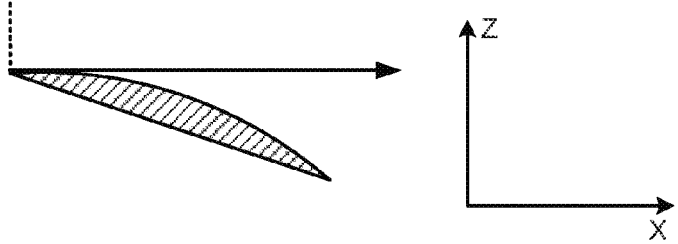
Figure 7:
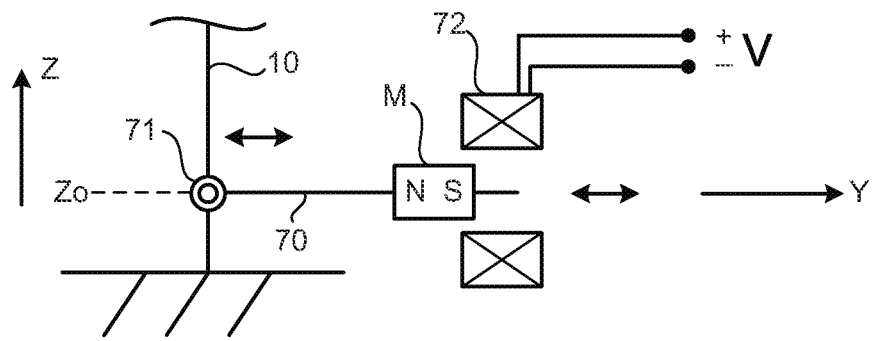
FIG. 7 illustrates one novel mechanism used to convert linear oscillation of the tensioning line to electrical power.

FIG. 6A-C illustrates the curved sheet with half claim shell shaped curvature;

FIG. 6A shows an X-Y plan view with contour lines indicating height above the plane;

FIG. 6B shows an X-Z plan view of the curved sheet, with curvature pointing upwards and to the left, with the convention that a curvature vector points inward from a concave surface;

FIG. 6C shows an X-Z plan view of the curved sheet at different phase of oscillation in the preferred fundamental mode than for FIG. 6B, and with curvature pointing downwards and to the left;

FIG. 7 illustrates one novel mechanism used to convert linear oscillation of the tensioner line 10 to electrical power. This mechanism employs a linkage rod 70 constrained at one end to the tensioner line 10 at a height Zo above the lower fixed point of the tensioner 10. A loop or similar constraint 71 constrains one end of the rod in the X and Y directions to move with the tensioner line 10. The tensioner drives the linkage 70 which drives movement of magnet M near coils 72 which results in output voltage V.

Figure 8:
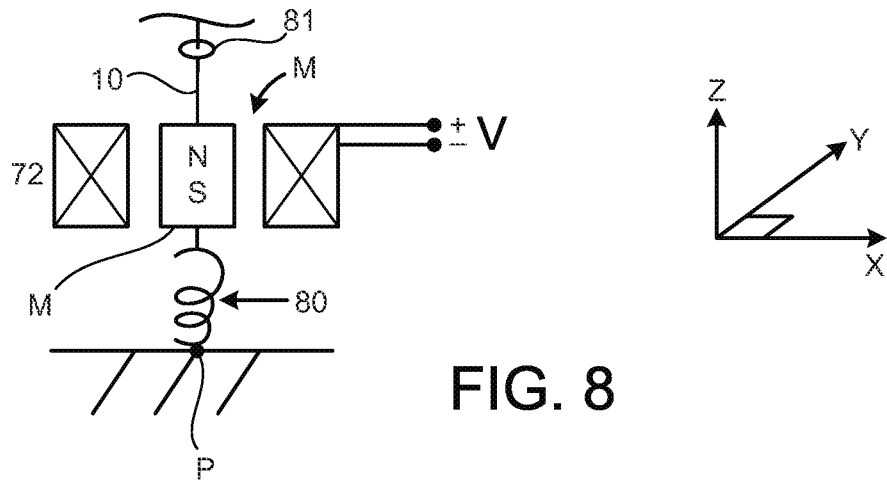
FIG. 8 illustrates one mechanism used to convert linear oscillation of the tensioning line to electrical power.

FIG. 8 illustrates one mechanism used to convert linear oscillation of the tensioning line to electrical power. This mechanism uses a spring 80 between fixed point P, magnet M, and tensioner 10. Spring 80 is connected to the lower end of tensioner 10. Spring 80 provides tension pulling tensioner 10 down. That tension is on average equal to tension in tensioner 10 pulling tensioner 10 up. Oscillations in tension along tensioner 10 caused by a fluid oscillator device (not shown) oscillating in respond to fluid flow generates a periodic variation in tension in tensioner 10. The periodic variation in tension drives magnet M periodically up and down. This generates electromotive force, V, in coil 72. Constraint 81 preferably forming an aperture around tensioner 10 prevents the portion of tensioner 10 below constraint 81 from moving in the X or Y direction such that substantially only Z direction motion occurs in magnet M and spring 80.

Figure 9:
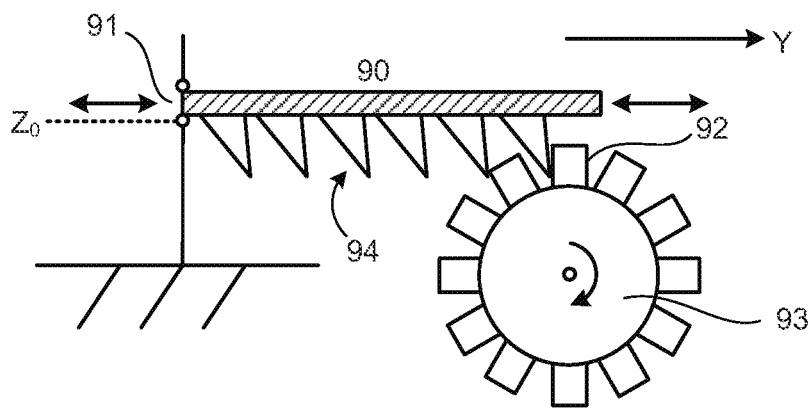
FIG. 9 illustrates one novel mechanism used to convert linear oscillation of the tensioning line to rotary motion.

FIG. 9 illustrates one novel mechanism used to convert linear oscillation of the tensioning line 10 to rotary motion. This mechanism uses a rack 90 constrained by constraint 91 to so that it oscillates substantially linearly along the Y direction. In cross section, teeth 94 of the rack 90 have one face either perpendicular to the extension direction of rack 90 or canted to lean over the base of the tooth, so that face can latch to a corresponding tooth 92 of pinion 93, thereby driving the pinion to rotate. In cross section, teeth 94 of the rack 90 have their other face canted in the same direction so that this other face does not latch to teeth 92 when teeth 92 are moving faster along the Y direction than teeth 91. Optionally, means (not shown) may be provided to push rack 90 down towards pinion 93 when rack 90 is moving to the left, and to push rack 90 up away from pinion 93 when rack 90 is moving to the right.

Figure 10A:
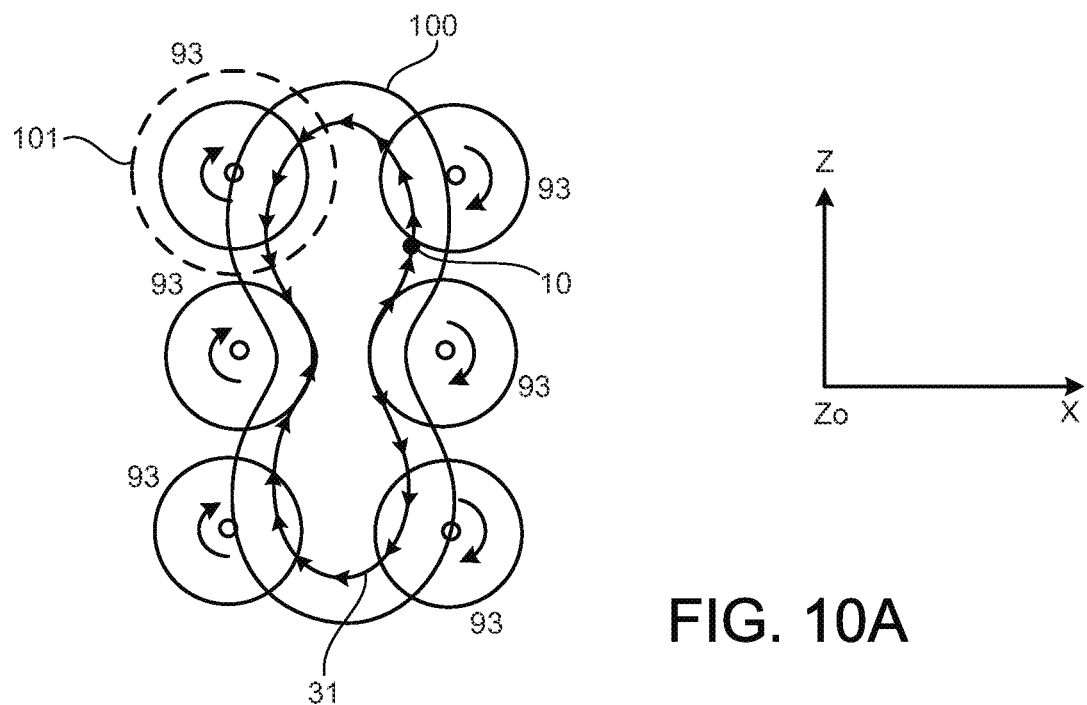
FIG. 10A illustrates one novel mechanism used to convert non-linear oscillation of the tensioning line to rotary motion.
Figure 10B:
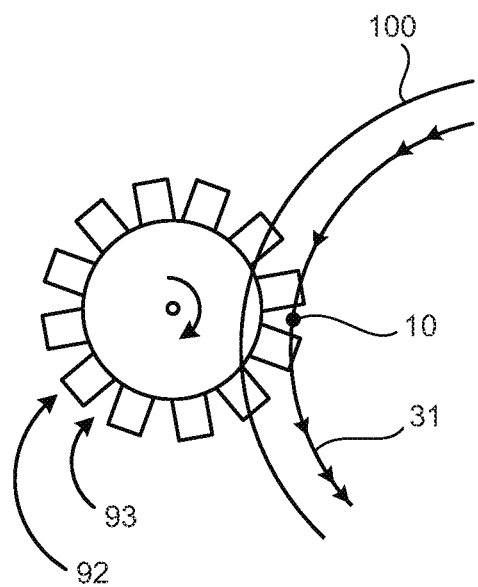
FIG. 10B is an expanded view of the Detail 101 in FIG. 10A.

FIGS. 10A and 10B illustrates one novel mechanism used to convert non-linear oscillation of the tensioning line to rotary motion. Constraint surface 100 forms an aperture through which tensioner 10 passes. Constraint surface 100 forms a bilobal structure having two approximately circular or oval regions connecting through a neck region. When sheet 20 oscillates in the preferred fundamental mode with large oscillation, tensioner 10 traverses path 31, and is constrained by constraint surface 100. Above or below (or above and below) in the Z direction from the constraint surface 100 reside geared pinions with teeth extending in the X-Y direction. The teeth extend above or below the constraint surface 100 to within the area delimited by the constraint surface 100 such that the pinion teeth 92 reside in regions of the path 31 traversed by the tensioner 10. Consequently, tensioner 10 pushes against pinion teeth 92 thereby rotating the pinions 93, as tensioner 10 traverses path 31. FIG. 10B is an enlarged view illustrating a portion of the path 31, tensioner 10, constraint surface 100, pinion 93, and pinion teeth 92.

Figure 11:
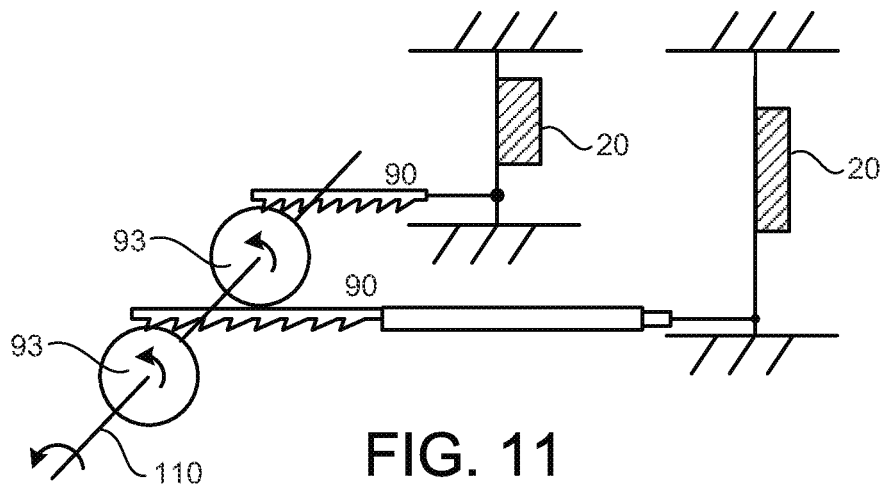
FIG. 11 illustrates one novel mechanism used to convert linear motion of a plurality of tensioning lines to rotary motion.

FIG. 11 illustrates one novel mechanism used to convert linear motion of a plurality of tensioning lines to rotary motion. This mechanism includes a plurality of the saw toothed rack 90 and pinion 93 mechanisms of FIG. 9 each of which is coupled to a different fluid oscillating device for converting fluid flow to useful energy. All of the pinions 93 are coupled to a single rotating shaft 110. FIG. 11 shows two racks and pinion devices. More than two are contemplated. It should be apparent that a large number of out of fluid flow oscillators will result in a substantially constant torque on the rotating shaft, due to lack of phase locking of the fluid flow oscillators, which is advantageous.

Figure 12:
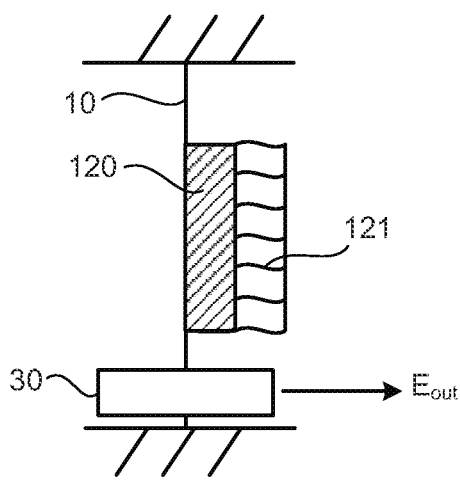
FIG. 12 illustrates an alternative novel device for converting fluid flow to useful energy including a rigid plate and a relatively flexible sheet.

FIG. 12 illustrates an alternative novel device for converting fluid flow to useful energy including a rigid plate 120 and a relatively flexible sheet 121. Plate 120 forms the leading edge and sheet 121 defines the trailing edge of this fluid flow converter. Plate 120 does not deform substantially. Plate 120 may be formed from wood, hard plastic, metal, ceramic, a composite or any other equivalently rigid material. Sheet 121 may be curved as noted above for sheets of the other fluid flow converters. In this embodiment, tensioner line 10 may consist of two pieces, one each extending from either upper and lower leading edge of plate 120 to a fixed point or energy conversion device 30.

Figure 13:
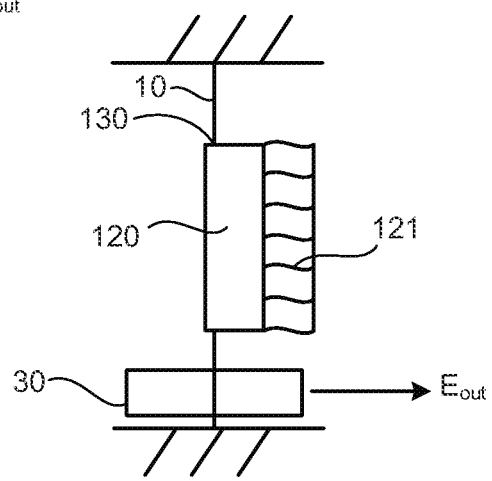
FIG. 13 illustrates an alternative novel device for converting fluid flow to useful energy including a rigid plate and a relatively flexible sheet, wherein the tensioning line has as set back from the leading edge of the rigid plate.
Figure 14:
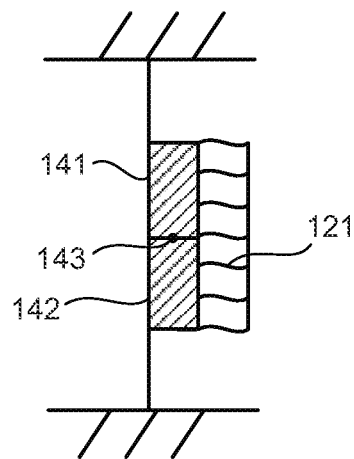
FIG. 14 illustrates an alternative novel device for converting fluid flow to useful energy including two rigid plates and a relatively flexible sheet.
Figure 15:
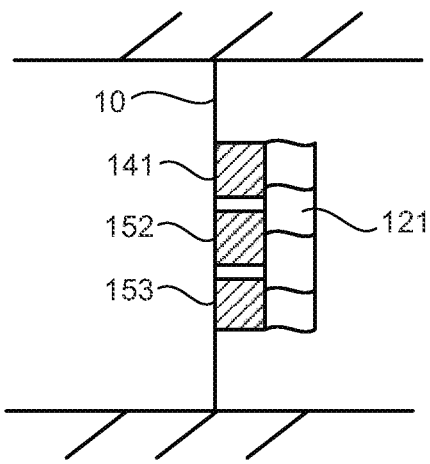
FIG. 15 illustrates an alternative novel device for converting fluid flow to useful energy including three rigid plates and a relatively flexible sheet.

FIG. 13 illustrates an alternative novel device for converting fluid flow to useful energy including a rigid plate 120 and a relatively flexible sheet 121. In this embodiment, a tensioning line connects at a set back location 130 from the leading edge of the rigid plate. Existence of the set back enables rigid plate 120 to rotate substantially about the tensioning line, thereby inducing oscillations in X and Y directions, and an oscillatory tension in tensioner 10. In this embodiment, tensioner 10 may consist of two pieces, one extending from each of the upper and lower set backs 130 of rigid plate 120 to a fixed point or energy conversion device 30. Sheet 121 may be curved as noted above for sheets of the other fluid flow converters FIG. 14 illustrates an alternative novel device for converting fluid flow to useful energy including two rigid plates 141, 142, having leading surfaces defining the leading edge of the fluid flow oscillator, trailing surfaces of the rigid plates connected to a leading edge of a relatively flexible sheet defining the trailing edge of the fluid flow oscillator. Plates 141, 142 may be constrained by constraint 143 by a line (rope, string, chain, etc) or a spring, to couple them such that they define strongly coupled oscillations. Sheet 121 may be curved as noted above for sheets of the other fluid flow converters FIG. 15 illustrates an alternative novel device similar to that of FIG. 14 but including 3 plates 151, 152, and 153. More coupled rigid plates, even or odd in number, are envisioned.

Figure 16:
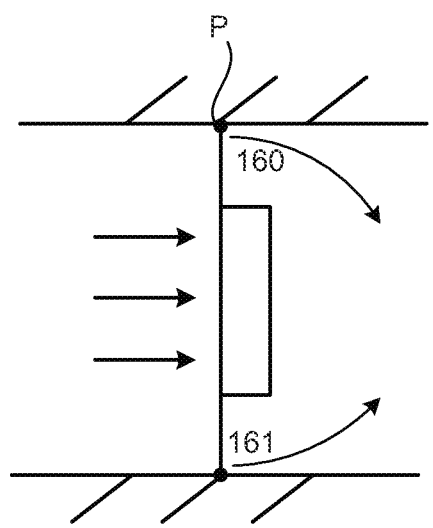
FIG. 16 illustrates tension sensitive latch for releasing one or both ends of a novel tensioned device in case of excessive fluid speed.

FIG. 16 illustrates tension sensitive latch (160, 161) for releasing from constraints one or both ends of the tensioner 10 of the curved sheet structure 14. This provides safety against excessive fluid speed induced forces that could otherwise cause structural damage. The tension sensitive latch may include a spring velcro, or the like, that releases upon application of tension above a determined value. Tensioner line 10 may include an extension passing through a loop adjacent latch 160 so that pulling the tensioner 10 raises the latch 160 back to position and engages the latch to reset fixing of tensioner 10 at upper fixed point P.

Figure 17:
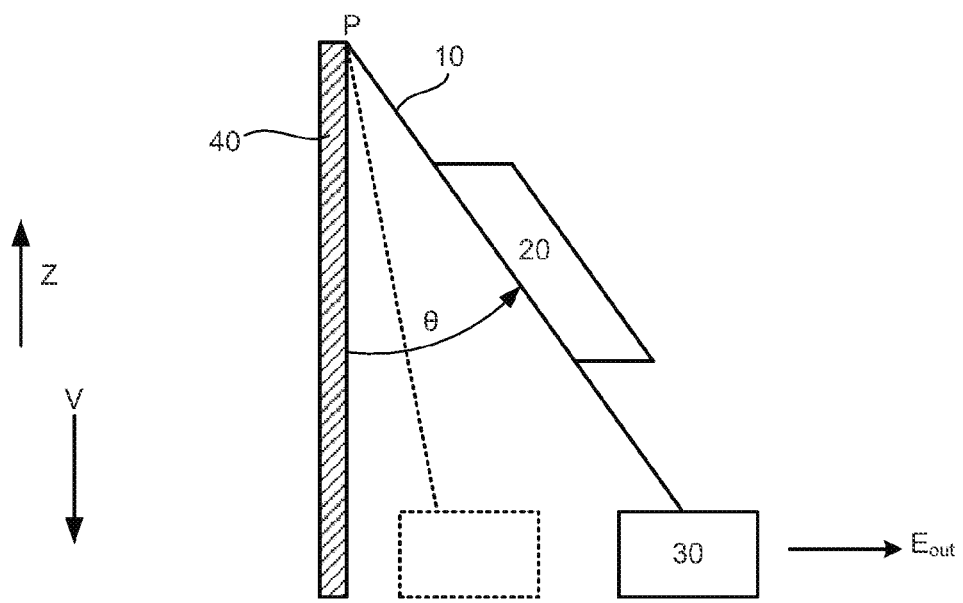
FIG. 17 illustrates an arrangement of a novel tensioned device having a tensioner angled relative to the vertical direction.

FIG. 17 illustrates an arrangement of a novel device with tensioner 10 angled relative to the vertical direction V by angle Theta. The curved sheet 20 and related fluid flow conversion devices described herein may have their tensioner line at any angle relative to the vertical, from zero to 90 degrees. The tensioner 10 is to vertical, the less sensitive the fluid flow oscillator is to fluid flow directions parallel to the surface of the earth. Accordingly, a vertical or nearly vertical tensioner line 10 is preferred.

Figure 18A:
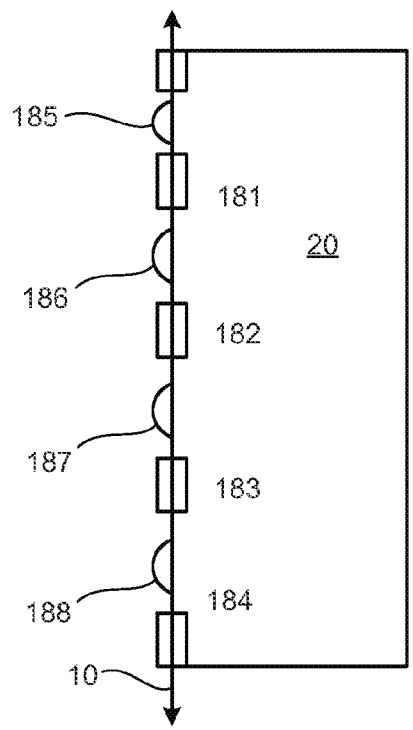
FIG. 18a and b illustrate a novel tensioned device in which curvature in the sheet is imposed by tension applied to the tensioning line at the leading edge.
Figure 18B:
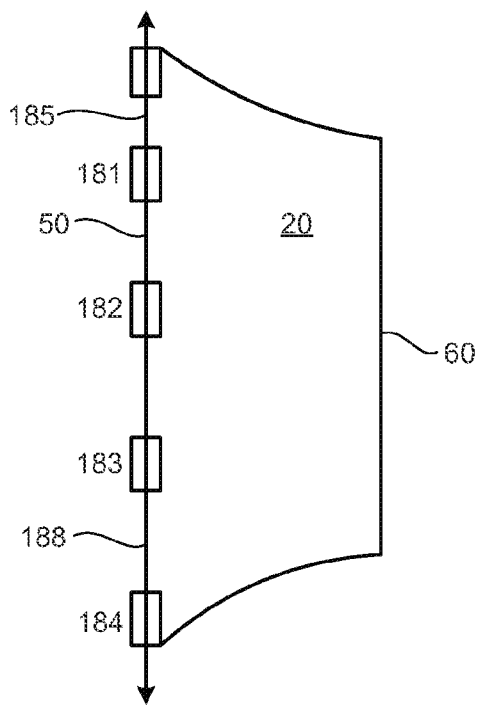

FIGS. 18A and 18B illustrate a novel tensioned device in which curvature in the sheet is imposed by tension applied to the tensioning line at the leading edge. In this device tensioner 10 is constrained at constraints 181, 182, 183, 184 to portions of sheet 20 near the leading edge of sheet 20. Tensioner 10 includes slack regions 185, 186, 187, 188 between the constrained portions 181, 182, 183, 184. FIG. 18B shows tension applied to tensioner 10 expanding slack regions 185, 186, 187, 188. This causes expansive stress to leading edge 50 lengthening leading edge 50 relative to trailing edge 60. This causes strain in the remainder of sheet 20 resulting in curvature in both X and Z directions.

Figure 19:
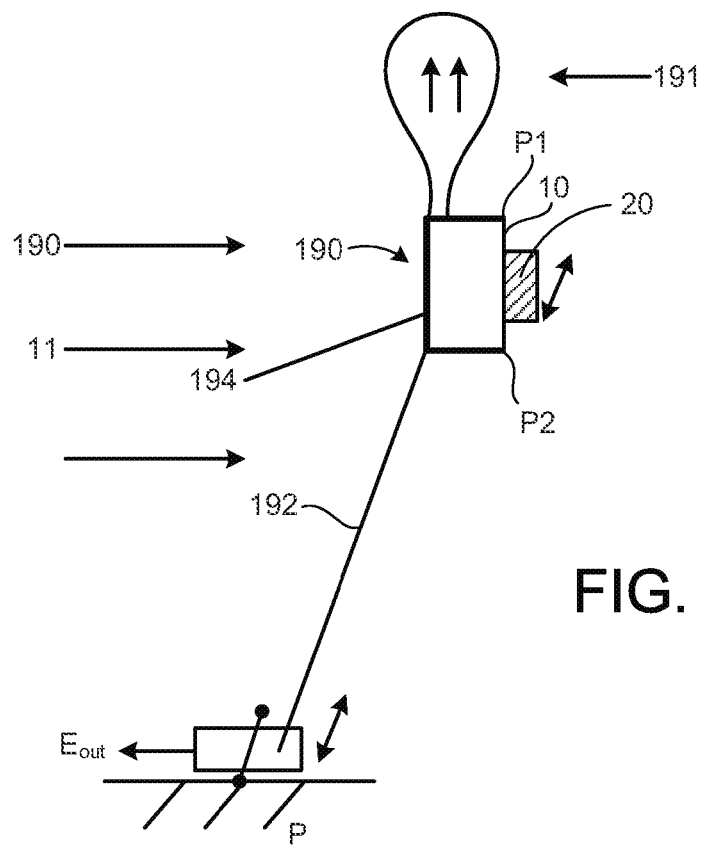
FIG. 19 illustrates a novel device including a novel tensioned device, a balloon or aerodynamic device, and a tensioning line extending to ground, sea, river, or lake bed.

FIG. 19 illustrates a novel device including a novel fluid oscillator device 190, balloon, glider, or other aerodynamic device 191, and tensioning line 192 for energy in converting fluid flow 11. Tensioning line 192 extends to ground, sea bed, river bed, or lake bed. Device 190 includes a relatively rigid "C" shaped structure 194 providing fixed points P1, P2, tensioner 10, and curved sheet 20 between points P1, P2. As sheet 20 oscillates in the preferred fundamental mode, it sends traveling waves down tensioning line 192 which provide both oscillating tension and traveling wave motion of line 192. Energy converter 30 converts the energy in the traveling waves to Eout in one of the same manner as noted herein above or described in the publications incorporated herein by reference.

Figure 20:
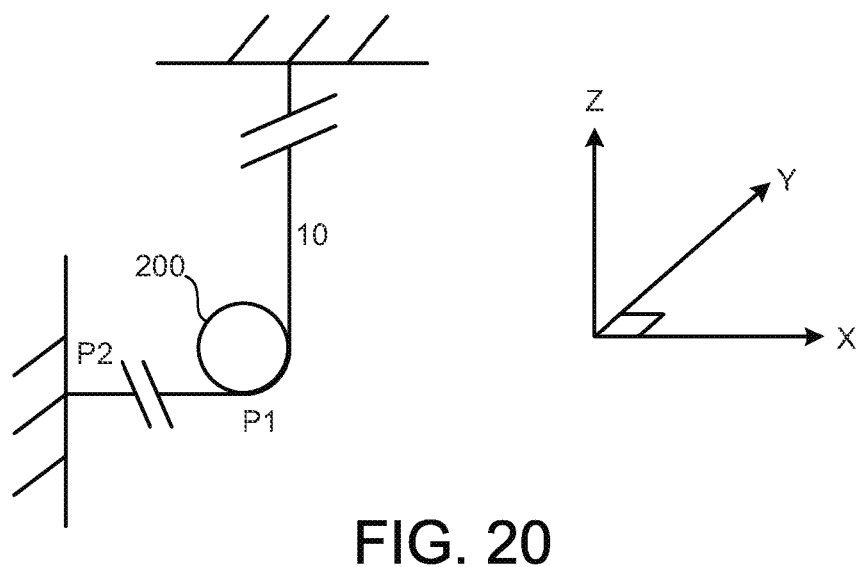
FIG. 20 illustrates fixed points defined by a constraint, such as a pulley.

FIG. 20 illustrates a constraint in the motion of tensioner 10, such as a pulley 200, at point P1. Pulley 200 may be fixed at P1 relative to X and Y directions which prevents tensioner 10 at pulley 200 from moving in X and Y directions. Flexible structure such as a spring between pulley 200 and fixed point P2 allow tensioner 10 to oscillate in response to oscillations in tension, and thereby rotate pulley 200.

FIG. 21A is a plan view of a flat sheet having cut outs 21;

FIG. 21B is a plan view of the sheet of FIG. 21A with the edges of cutouts joined to form a curved sheet;

FIG. 21A illustrates a sheet 20 excluding cut outs 21 defining cut out edges 22.

FIG. 21B illustrates the cut out edges of each cutout of the sheet of FIG. 21A joined at joints 23 resulting in a curved sheet 20C. Curvature is out of the plane of the figure.

FIG. 22 shows an alternative energy conversion device for converting motion in tensioner 10 to output voltage or electrical energy V. FIG. 22 shows tensioner 10 configured to rotate pulley 200. Pulley 200 has magnet M affixed to it so that when pulley 200 rotates magnet 10 provides changes in magnet field cutting coils 72, thereby inducing voltage V. Coil 72 may be placed parallel to the axis of rotation of pulley 200 so that the ends N, S, of the magnet M, pass by the axis of coil 72. Alternatively, the axle of pulley 200 may extend away from the groove in the pulley and magnet M may be mounted thereto and coil 72 located nearby.

Figure 23:
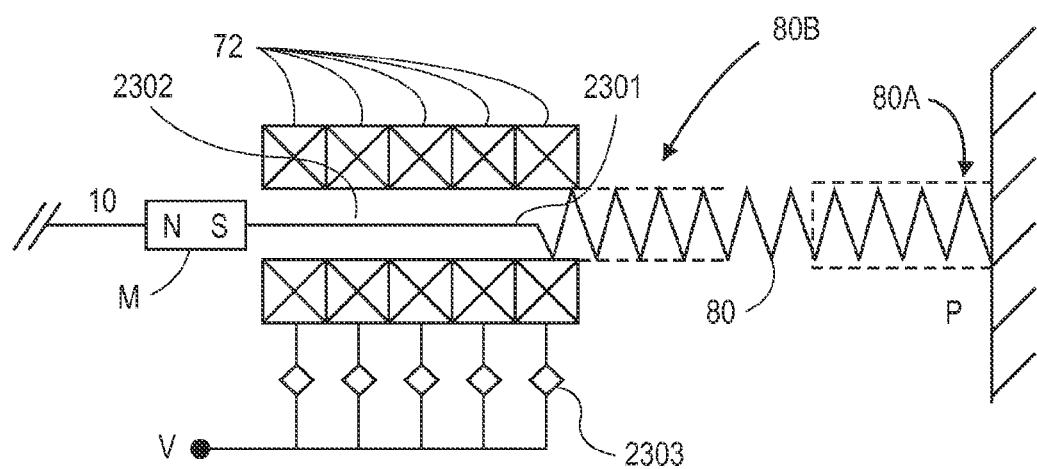
FIG. 23 is a schematic view of a novel energy conversion device for converting linear motion in tensioner 10 into electrical energy.

FIG. 23 shows an energy conversion device for converting linear motion in tensioner 10 into electrical energy. This device includes a spring 80 fixed at one end to immovable point P, and connecting at the other end to a line (rigid rod or flexible rope) 2301 which connects via suitable coupler to one end of magnet M. The other end of magnet M is connected via a suitable coupler to tensioner 10. Spring 80 has expanded position 80B and contracted position 80A. As spring 80 changes from expanded to contracted positions, magnet M traverses the space 2302 between coils 72. Plural coils are coaxially aligned around space 2302. Each coil has terminals connected to a separate rectifier circuit 2302, such as a full wave bridge rectifier circuit, or a active field effect transistor rectifier circuit. Output of all rectifier circuits are connected resulting in output voltage V. This configuration takes advantage of the extrema in voltage response of each coil when the magnet is positioned near the face of each coil.

Figure 24:
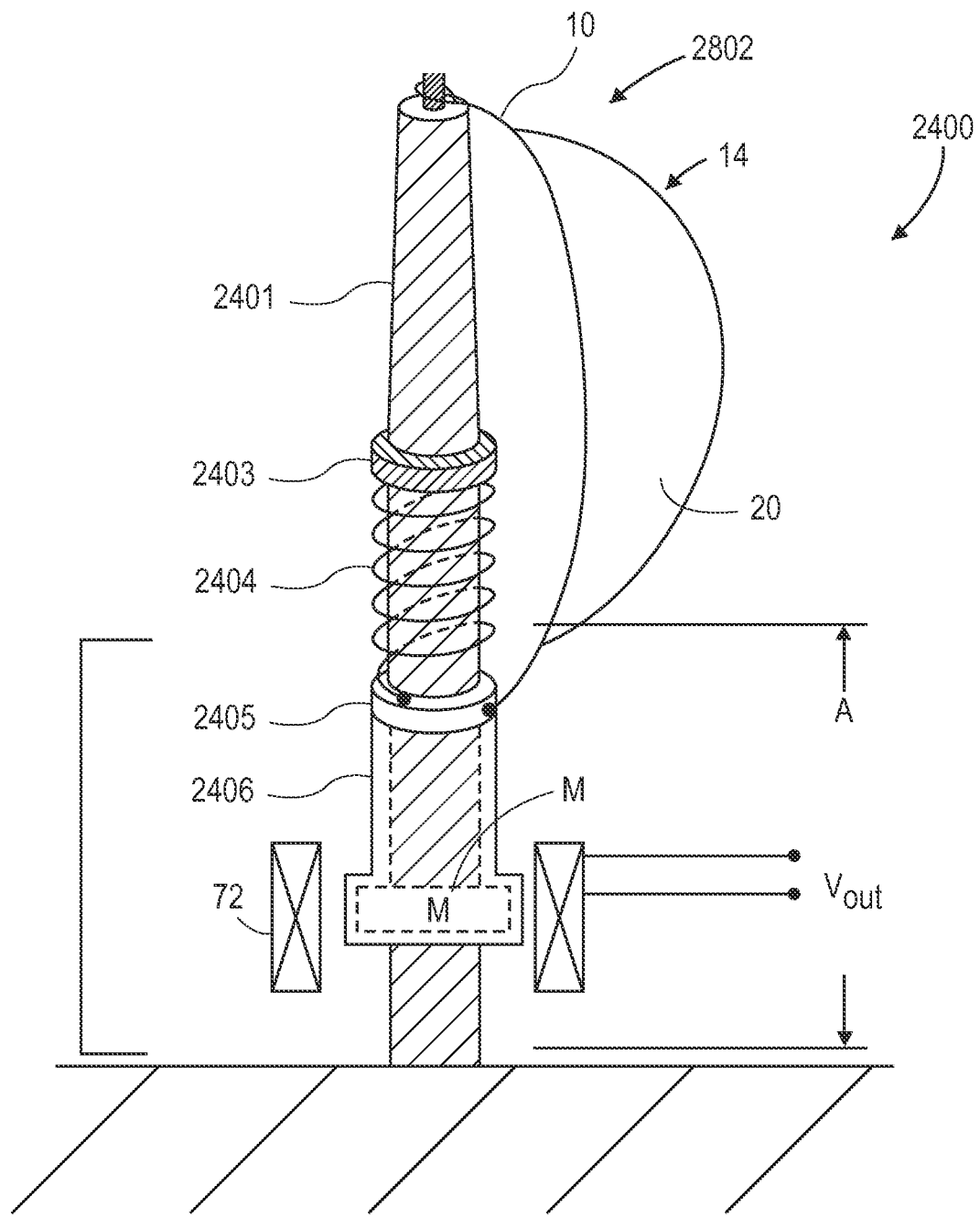
FIG. 24 is a perspective view of a novel coaxial device 2400 for converting fluid flow into electrical energy having the magnet of the electrical generator exterior to the extending pole.

FIG. 24 shows is a perspective view of a novel coaxial device 2400 which includes the curved sheet structure 14 comprising tensioner 10 and curved sheet 20. The top end of tensioner 10 is looped about a reduced diameter portion of pole 2401 at the to thereof. Annular ring 2403 is fixed to pole 2401 at a fixed height. Annular ring 2405 is joined to sheath 2406. Magnet M is constrained inside a cavity of the hub portion at the lower end of sheath 2406. Annular ring 2405, sheath 2406, and magnet M are all annular and are disposed around pole 2401, and are not rigidly fixed to pole 2401. A top end of spring 2404 is secured to ring 2403. A bottom end of spring 2404 is secured to ring 2405. The bottom end of tensioner 10 is secured to ring 2405 or sheath 2406. Coils 72 reside outside of the lower portion of pole 2401. In operation, curved sheet structure 14 oscillates causing oscillating force on ring 2405 in the vertical direction. This drives ring 2405, sheath 2406, and magnet M up and down along pole 2401. As magnet M oscillates, it induces voltage Vout in coil 72. A benefit of this geometry is that the oscillator can rotate around the axis of the pole, following changes in direction of the fluid flow field 11.

Figure 25:
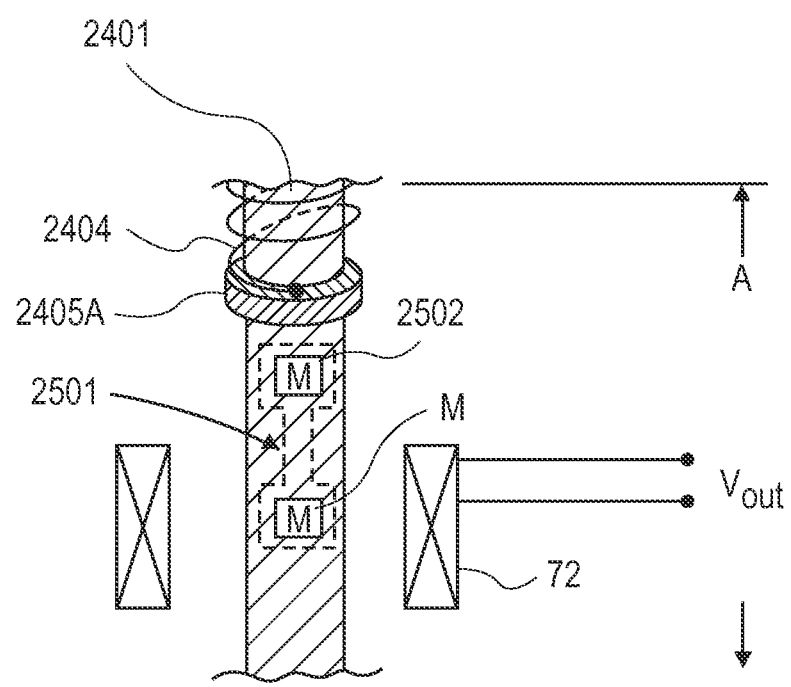
FIG. 25 is perspective view of an alternative to the portion A-A of the novel device of FIG. 24 having the magnet fo the electrical generator interior to the extending pole.

FIG. 25 shows an alternative to the region M-M in FIG. 24 in which the magnet M resides inside a hollow in the pole 2401. In this alternative, pole 2401 is hollow. Annular ring 2405 is replaced by annular ring 2405A, which comprises magnetic material. Dumbbell shaped internal container 2501 comprises a first magnet, M, whose magnetic attraction to annular ring 2405A retains it in position inside of ring 2501, adjacent ring 2405A. Container 2501 is shaped so that it retains the lower magnet, M, inside pole 2401 and near coils 72. When ring 2405A oscillates up and down, so does the lower magnet, M, thereby inducing voltage Vout in coil 72. This alternative does not require an annular magnet on the outside of pole 2401.

The invention claimed is:

1. A fluid flow oscillator device comprising:
  a curved sheet structure comprising a curved sheet and a tensioner, wherein
  said tensioner extends along a leading edge of said curved sheet;
  wherein said curved sheet defines a curved sheet first major surface and a curved sheet second major surface, said curved sheet first major surface opposes said curved sheet second major surface;
  wherein curved sheet first major surface direction of curvature of substantially all of said curved sheet first major surface points either outward from said curved sheet first major surface away from said curved sheet, or inward from said curved sheet first major surface into said curved sheet; and
  wherein direction of curvature of substantially all of said curved sheet second major surface is the same as said curved sheet first major surface direction of curvature.

2. The device of claim 1 wherein said tensioner is under tension.

3. The device of claim 1 wherein Curvature Ratio, CR, of said curved sheet, is non zero, and is substantially independent of distance from said leading edge.

4. The device of claim 1 wherein Curvature Ratio, CR, of said curved sheet, is greater than 0.0003 inverse inches at all distances from the leading edge.

5. The device of claim 1, further comprising:
an energy conversion device; and
wherein said energy conversion device comprises a coupler coupling to said tensioner that results in movement of said coupler in response to change in tension in said tensioner.

6. The device of claim 5 wherein said tensioner is under tension.

7. The device of claim 1 wherein curvature of substantially all of said curved sheet first major surface periodically inverts during oscillation, such that:
curvature of substantially all of said curved sheet first major surface points outward from said curved sheet first major surface away from said curved sheet, at one phase of oscillation, and
curvature of substantially all of said curved sheet first major surface points inward into said curved sheet first major surface away from said curved sheet, at another phase of oscillation.

8. The device of claim 5 wherein Curvature Ratio, CR, of said curved sheet, is greater than 0.0003 inverse inches at all distances from the leading edge.

9. The device of claim 5 wherein said tensioner has an extended direction which defines a direction of tension; and wherein said coupler is coupled to the direction of tension in said tensioner and thereby moves generally parallel to the direction of tension in the tensioner when said oscillator device oscillates.

10. The device of claim 5 wherein said tensioner has an end fixed to an immovable point and said coupler is coupled to said tensioner closer to said immovable point than a center of said curved sheet.

11. The device of claim 5 wherein said energy conversion device comprises a magnet, a plurality of coils, and a plurality of rectifiers, wherein the plurality of coils are aligned along an axis, wherein each one of the plurality of coils is coupled to a corresponding one of the plurality of rectifiers, and outputs of all the plurality of rectifiers are connected to one another.

12. The device of claim 5 wherein said energy conversion device comprises a pole, a first annular ring, a spring, a magnet, and a coil, wherein said first annular ring rings said pole and is fixed to said pole, said spring has a first end fixed to said first annular ring and winds around said pole, and movement of said spring results in movement of said magnet along the axis of said pole which induces voltage in said coil.

13. The device of claim 12 wherein said magnet is disposed inside of a hollow in said pole.

14. The device of claim 1 wherein said curved sheet structure has said direction of curvature of substantially all of said curved sheet first major surface and said curved sheet second major surface in the absence of all external forces.

15. The device of claim 1:
wherein said tensioner extends between two points and is under tension between said two points; and
wherein, when said curved sheet structure is exposed to a fluid flow field having a flow direction perpendicular to a line extending between said two points, said curved sheet structure oscillates.

16. The device of claim 1:
wherein said tensioner extends between two points and is under tension between said two points;
wherein a line extending between said two points defines a first direction; and
wherein, when said curved sheet structure is exposed to a fluid flow field having flow in a second direction perpendicular said first direction, a leading edge of said curved sheet oscillates in at least a third direction perpendicular to both said first direction and said second direction, such that, at one time, all of said leading edge is displaced in the third direction to a first side of the line extending through the two fixed points, and at another time, all of said leading edge is displaced in the third direction to a second side of the line extending through the two points, said second side being on an opposite side of said line from said first side.

17. The device of claim 1, wherein said curved sheet structure comprises polymer material that has Young's modulus in the range of about 0.01 to 10.0 Giga Pascals.

18. The device of claim 1 wherein said tensioner either comprises rope, cable, chain, or single fiber.

19. The device of claim 1 wherein said leading edge is mechanically coupled to said tensioner.

20. The device of claim 1 wherein said tensioner extends along the entirety of said leading edge of said curved sheet; and wherein said tensioner is mechanically coupled to said leading edge of said curved sheet along the entirety length of said leading edge of said curved sheet.

* * * * *